(12) United States Patent
Morikuni

(10) Patent No.: US 9,128,365 B2
(45) Date of Patent: Sep. 8, 2015

(54) PROJECTOR, PROJECTION UNIT, AND INTERACTIVE BOARD

(75) Inventor: Eiji Morikuni, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 573 days.

(21) Appl. No.: 13/428,368

(22) Filed: Mar. 23, 2012

(65) Prior Publication Data

US 2012/0249978 A1    Oct. 4, 2012

(30) Foreign Application Priority Data

Apr. 1, 2011  (JP) .................................. 2011-081648
May 26, 2011  (JP) .................................. 2011-117677

(51) Int. Cl.
| | |
|---|---|
| *G03B 21/00* | (2006.01) |
| *G03B 21/28* | (2006.01) |
| *G02B 17/08* | (2006.01) |
| *G03B 21/14* | (2006.01) |
| *G03B 21/62* | (2014.01) |

(Continued)

(52) U.S. Cl.
CPC ............ *G03B 21/28* (2013.01); *G02B 17/0896* (2013.01); *G03B 21/147* (2013.01); *G03B 21/62* (2013.01); *G03B 21/10* (2013.01); *G03B 21/2073* (2013.01)

(58) Field of Classification Search
CPC . G02B 17/0896; G03B 21/142; G03B 21/147
USPC ......................... 353/98, 70; 359/649; 348/744
See application file for complete search history.

(56) References Cited

U.S. PATENT DOCUMENTS

| | | | |
|---|---|---|---|
| 5,521,659 A | * | 5/1996 | Arnott .......................... 353/119 |
| 5,539,579 A | | 7/1996 | Miyatake et al. |
| 6,631,994 B2 | | 10/2003 | Suzuki et al. |

(Continued)

FOREIGN PATENT DOCUMENTS

| | | |
|---|---|---|
| CN | 1906519 A | 1/2007 |
| CN | 101533207 A | 9/2009 |

(Continued)

OTHER PUBLICATIONS

U.S. Office Action dated Nov. 1, 2013 from U.S. Appl. No. 13/428,593.

(Continued)

*Primary Examiner* — Sultan Chowdhury
*Assistant Examiner* — Danell L Owens
(74) *Attorney, Agent, or Firm* — Oliff PLC

(57) ABSTRACT

A projector includes: a main body section including a light source, a display surface irradiated with light from the light source, and an emission optical system capable of emitting the light from the display surface, and once converting the light from the display surface into light forming an image plane of the display surface tilted with respect to the display surface; and a projection unit projecting the light from the display surface, emitted from the emission optical system, toward an irradiated surface, and having an angle-widening mirror with a concave surface having positive power and reflecting and widening light forming an image plane of the display surface tilted with respect to the display surface. The main body section or the projection unit includes a variable power optical system varying magnification of the image forming the image plane of the display surface tilted with respect to the display surface.

12 Claims, 23 Drawing Sheets

(51) Int. Cl.
*G03B 21/10* (2006.01)
*G03B 21/20* (2006.01)

(56) References Cited

U.S. PATENT DOCUMENTS

| | | |
|---|---|---|
| 7,967,448 B2 | 6/2011 | Destain |
| 8,403,505 B2 | 3/2013 | Dai |
| 8,425,041 B2 | 4/2013 | Schuck et al. |
| 8,425,042 B2 | 4/2013 | Hruska et al. |
| 8,540,379 B2 | 9/2013 | Jikuya et al. |
| 2001/0048558 A1 | 12/2001 | Lin |
| 2002/0131021 A1* | 9/2002 | Wada ............................... 353/31 |
| 2004/0174611 A1 | 9/2004 | Hatakeyama |
| 2007/0184368 A1 | 8/2007 | Nishikawa et al. |
| 2007/0216877 A1 | 9/2007 | Sacre et al. |
| 2008/0252860 A1 | 10/2008 | Matsumoto et al. |
| 2009/0168031 A1 | 7/2009 | Imaoka et al. |
| 2009/0225233 A1 | 9/2009 | Hirata et al. |
| 2009/0231690 A1 | 9/2009 | Nishikawa et al. |
| 2009/0279055 A1 | 11/2009 | Amano |
| 2010/0053737 A1* | 3/2010 | Fujita et al. .................. 359/364 |
| 2010/0141907 A1 | 6/2010 | Hirata et al. |
| 2010/0238414 A1 | 9/2010 | Togino |
| 2010/0238416 A1 | 9/2010 | Kuwata et al. |
| 2010/0277703 A1 | 11/2010 | Hisada et al. |
| 2011/0122328 A1 | 5/2011 | Hirata et al. |
| 2012/0242911 A1* | 9/2012 | Znamenskiy ................. 348/745 |

FOREIGN PATENT DOCUMENTS

| | | |
|---|---|---|
| JP | A-6-11767 | 1/1994 |
| JP | A-2002-6398 | 1/2002 |
| JP | A-2003-136892 | 5/2003 |
| JP | A-2004-252345 | 9/2004 |
| JP | A-2004-295107 | 10/2004 |
| JP | A-2007-11248 | 1/2007 |
| JP | A-2008-83428 | 4/2008 |
| JP | A-2008-90200 | 4/2008 |
| JP | A-2009-083277 | 4/2009 |
| JP | A-2009-122587 | 6/2009 |

OTHER PUBLICATIONS

U.S. Office Action dated Apr. 2, 2014 from U.S. Appl. No. 13/428,593.

U.S. Office Action dated Jul. 23, 2014 from U.S. Appl. No. 13/428,593.

U.S. Appl. No. 13/428,593, filed Mar. 23, 2012 in the name of Morikuni et al.

* cited by examiner

PROJECTOR, PROJECTION UNIT, AND INTERACTIVE BOARD

BACKGROUND

1. Technical Field

The present invention relates to a projector, a projection unit, and an interactive board, and in particular to a projector for ultra-short projection.

2. Related Art

In recent years, projectors each provided with a projection optical system for so-called ultra-short projection, which makes it possible to display a large screen with a short projection distance, have been put into product. By adopting such a projection optical system, it has become possible to display a large screen with a super short distance (e.g., a 100-inch screen with the projection distance of 40 cm) compared to existing front projection projectors. Such projectors are generally made usable only for super short-distance projection, and are expected to make it possible to be used for the super short-distance projection and the medium and long-distance projection of existing well-known projectors in accordance with the purposes. In, for example, JP-A-2002-6398 (Document 1), there is proposed a technology of a projector, which increases the zoom ratio using a reflective projection unit attached on the screen side with respect to the projection lens. It becomes possible to obtain an image with different zoom ratio between the state of attaching the reflective projection unit and the state of detaching it.

If the reflective projection unit according to Document 1 is applied to the super short-distance projection, there arises a necessity of substantially increasing the zoom ratio. On this occasion, the higher the zoom ratio is set, the more difficult it becomes to reduce the aberration. Further, since the configuration of disposing a plurality of curved mirrors eccentrically with respect to the optical axis (the center axis) of the lens is adopted, the case in which a minute displacement in the optical element or the like significantly affects the image increases. Therefore, an extremely accurate adjustment is required for obtaining a desired optical performance, and moreover, it becomes also difficult to reduce the aberration due to the eccentric optical system.

Further, in recent years, due to the increase in multimedia contents, a so-called interactive board used in the education field or presentations has been becoming in widespread use. The interactive board has a feature of being capable of displaying the content and at the same time allowing the user to make insertion to the content. Since the interactive board generally has a size substantially the same as those of existing blackboards or whiteboards, it results that display in relatively wide range is required. If an ordinary direct view monitor is applied to the wide-range display in the interactive board, there arises a problem in the weight, the power consumption, and the cost of the whole device.

In, for example, JP-A-2003-136892 (Document 2) and JP-A-2004-252345 (Document 3), there is proposed a technology of an interactive board which reflects the light projected from a projector with a planar mirror to thereby input it into a transmissive screen. In JP-A-2009-83277 (Document 4) there is proposed a technology of an interactive board provided with a projector for super short-distance projection. By the enlarged projection using a projector, display in a wide range is made possible. By using a projector, reduction in weight, power consumption, and cost becomes possible. It should be noted that in the technologies of Documents 2 and 3, there arises a problem that the size in the depth direction grows to thereby degrade facility of installation since the large planar mirror disposed at an angle with the transmissive screen. The projector in the technology of Document 4 is only applied to the super short-distance projection, and has a problem that it is low in convenience because of the limited usage.

SUMMARY

An advantage of some aspects of the invention is to provide a projector and a projection unit used for the projector for realizing display of an image by the ultra-short projection with a super short distance and display of an image by the projection with a middle or long distance.

Another advantage of some aspects of the invention is to provide a convenient interactive board capable of reducing the weight, the power consumption, and the cost, and suppressing the depth size.

An aspect of the invention is directed to a projector including a main body section including a light source, a display surface irradiated with light from the light source, and an emission optical system capable of emitting the light from the display surface, and once converting the light from the display surface into light forming an image plane of the display surface tilted with respect to the display surface, and a projection unit adapted to project the light from the emission optical system, which is emitted from the display surface, toward an irradiated surface, and having an angle-widening mirror with a concave surface having positive power and adapted to reflect and widen an angle of light forming an image plane of the display surface tilted with respect to the display surface, wherein either one of the main body section and the projection unit includes a variable power optical system adapted to vary magnification of the image forming the image plane of the display surface tilted with respect to the display surface.

In the projector described above, the main body section and the projection unit are combined with each other to thereby make the super short-distance projection possible. The projection unit is detached from the main body section to thereby make it possible for the main body section to perform the middle and long-distance projection by itself. Here, since the angle-widening mirror provided to the projection unit reflects and widen the angle of the light forming the image plane (i.e., the image plane sufficiently tilted with respect to the plane perpendicular to the normal line of the optical axis or the optical axis) sufficiently tilted with respect to the display surface or the optical axis, the preferable ultra-short projection with the aberration such as distortion prevented from occurring can be performed without adopting the eccentric optical system. Further, by widening the angle of the light forming the picture due to the reflection by the angle-widening mirror with a concave surface, reduction of the color aberration due to the angle widening becomes also possible. Further, the image forming the image plane tilted with respect to the display surface can be made to have an appropriate size using the variable power optical system. Thus, it is possible to obtain a projector capable of display of the image using the ultra-short projection with a super short distance and display of the image using the middle and long-distance projection.

In a specific aspect of the invention, the projector described above is configured such that the variable power optical system is a contraction optical system adapted to relatively contract the image forming the image plane of the display surface tilted with respect to the display surface. Thus, it is possible to contract the image forming the image plane tilted with respect to the display surface to thereby perform the ultra-short projection.

In another specific aspect of the invention, the projection unit images the image plane of the display surface tilted with respect to the display surface on the irradiated surface parallel to the display surface. Therefore, observation of an appropriate image without tilt becomes possible.

In still another specific aspect of the invention, the emission optical system can be switched between a normal display state in which an image forming the image plane of the display surface parallel to the display surface is imaged within a first range with a relatively long distance along an optical axis, and a macro display state in which an image forming the image plane of the display surface tilted with respect to the display surface is imaged within a second range with a relatively short distance along the optical axis. It should be noted that it is possible to form a relatively large image in the relatively long distance due to the emission optical system in the normal display state, and to form a relatively small image in the relatively short distance due to the emission optical system in the macro display state.

Another aspect of the invention is directed to a projector including a main body section including a light source, a display surface illuminated by light from the light source, and an emission optical system adapted to emit light from the display surface, and a projection unit adapted to project the light from the emission optical system, which is emitted from the display surface, toward an irradiated surface, and having an angle-widening mirror with a concave surface having positive power and adapted to reflect and widen an angle of light from the display surface, wherein light forming an image plane of the display surface parallel to the display surface is provided in a first range with a relatively long distance along an optical axis, and light forming an image plane of the display surface tilted with respect to the display surface is provided in a second range with a relatively short distance along the optical axis.

In this projector described above, the main body section and the projection unit are combined with each other to thereby make the super short-distance projection possible. The projection unit is detached from the main body section to thereby make it possible for the main body section to perform the middle and long-distance projection by itself. Here, since the angle-widening mirror provided to the projection unit reflects and widens the angle of the light forming the image plane (i.e., the image plane sufficiently tilted with respect to the plane perpendicular to the normal line of the optical axis or the optical axis) sufficiently tilted with respect to the display surface or the optical axis, the preferable ultra-short projection with the aberration such as distortion prevented from occurring can be performed without adopting the eccentric optical system. Further, by widening the angle of the light forming the picture due to the reflection by the angle-widening mirror with a concave surface, reduction of the color aberration due to the angle widening becomes also possible. Thus, it is possible to obtain a projector capable of display of the image using the ultra-short projection with a super short distance and display of the image using the middle and long-distance projection.

In a specific aspect of the invention, either of the projectors described above is configured such that the main body section is detachably attached to the projector. Thus, it is possible to take out the relatively lightweight main body section from the projector to thereby perform the middle and long-distance projection.

In another specific aspect of the invention, the emission optical system and the projection unit are arranged so as to have respective optical axes aligned with each other. According to this configuration, adjustment of the optical system and processing of the optical element for obtaining the desired optical performance can be made easier. In particular, alignment between the main body section and the projection unit can be made easier.

In still another specific aspect of the invention, the emission optical system and the projection unit constitute a shift optical system adapted to make the light from the display surface proceed while being shifted from the optical axis. According to this configuration, it is possible to avoid the interference of the light reflected by the angle-widening mirror with the optical element on the optical axis, and to make the light widened in the angle proceed to the irradiated surface.

Still another aspect of the invention is directed to a projection unit used in combination with a main body section including a light source, a display surface irradiated with light from the light source, and an emission optical system adapted to emit light from the display surface, and adapted to project the light from the emission optical system, which is emitted from the display surface, toward the irradiated surface and including an angle-widening mirror with a concave surface having positive power and adapted to reflect and widen the angle of light forming an image plane of the display surface tilted with respect to the display surface, and a variable power optical system adapted to vary magnification of an image forming the image plane of the display surface tilted with respect to the display surface. According to this configuration, there can be obtained a projection unit for switching from the display of the image by the middle and long-distance projection to the display of the image by the ultra-short projection with a super short distance.

Yet another aspect of the invention is directed to an interactive board including one of the above projectors, and a screen display section including the irradiated surface, and adapted to make it possible to write other information on the irradiated surface, wherein the main body section including the emission optical system out of the projector is detachably attached.

The interactive board displays a picture on the screen display section using the ultra-short projection from the projector having the main body section and the projection unit combined with each other. By adopting the configuration for the ultra-short projection, the size in the depth direction can be suppressed to a small size. Further, the main body section including the emission optical system is detachably attached to the interactive board, and by making it possible for the main body section to perform the middle and long-distance projection by itself, a high level of versatility and convenience can be assured. By applying the projector for enlarged projection, it becomes possible for the interactive board to reduce the weight, the power consumption, and the cost. Thus, there can be obtained the interactive board capable of reducing the weight, the power consumption, and the cost, and suppressing the depth size, and thus having a high level of convenience.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some embodiments of the invention will be described in detail with reference to the accompanying drawings.

First Embodiment

Figure 1:
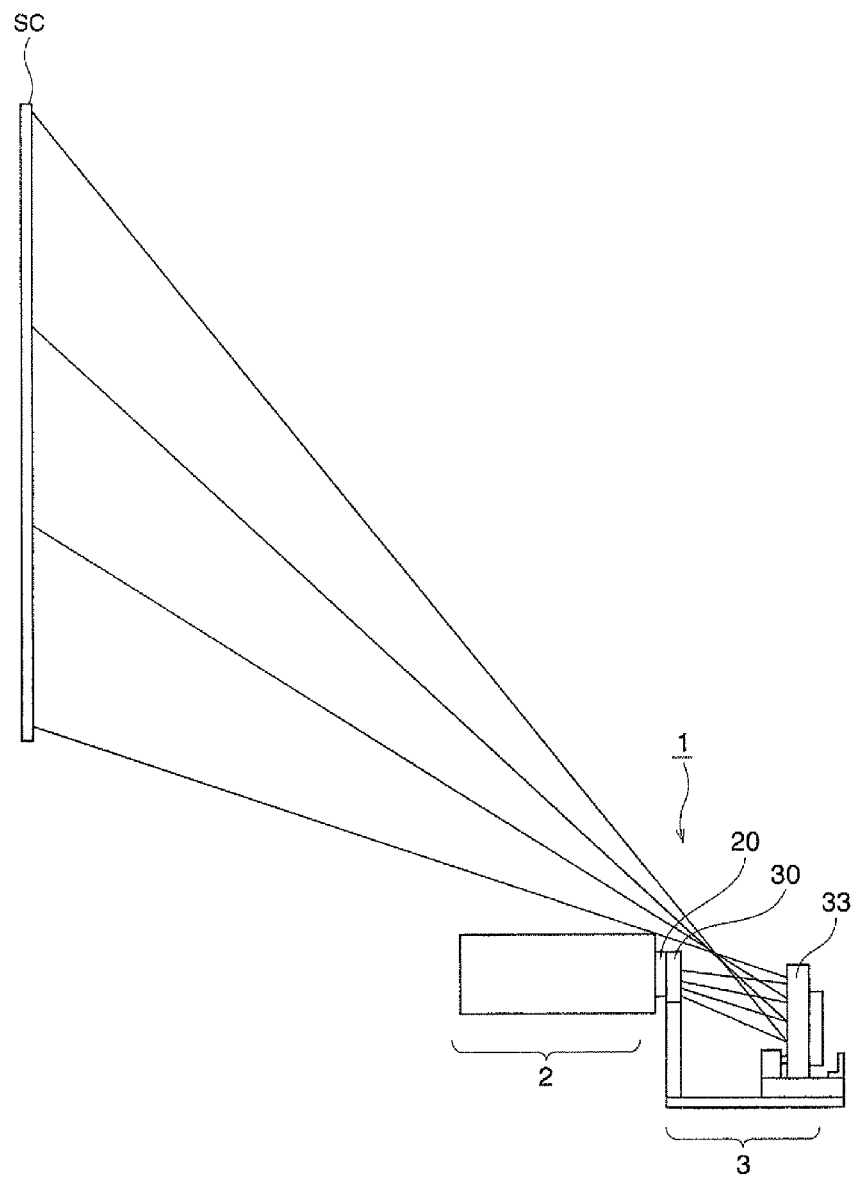
FIG. 1 is a diagram showing a schematic configuration of a projector according to a first embodiment of the invention.

FIG. 1 is a diagram showing a schematic configuration of a projector 1 according to a first embodiment of the invention. The projector 1 has a main body section 2 and a projection unit 3. The main body section 2 emits picture light corresponding to an image signal. The projection unit 3 projects the picture light from the main body section 2 toward an irradiated surface of a screen SC.

Figure 2:
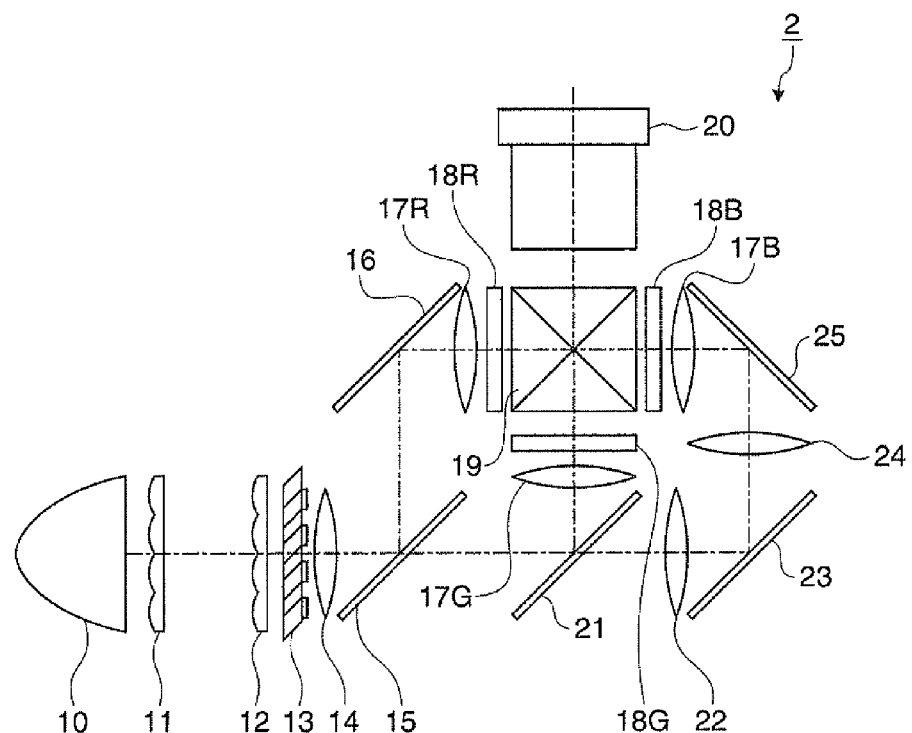
FIG. 2 is a diagram showing a schematic configuration of a main body section.

FIG. 2 is a diagram showing a schematic configuration of the main body section 2. A light source 10 is, for example, a super-high pressure mercury lamp, and emits light including R light, G light, and B light. Here, the light source 10 can be a discharge light source other than the super-high pressure mercury lamp, or can be a solid-state light source such as an LED or a laser. A first integrator lens 11 and a second integrator lens 12 each have a plurality of lens elements arranged in an array. The first integrator lens 11 divides a light beam from the light source 10 into a plurality of light beams. Each of the lens elements of the first integrator lens 11 focuses the light beam from the light source 10 in the vicinity of the corresponding one of the lens elements of the second integrator lens 12. The lens elements of the second integrator lens 12 and an overlapping lens 14 form the images of the respective lens elements of the first integrator lens 11 on liquid crystal display panels 18R, 18G, and 18B. According to such a configuration, the light from the light source 10 illuminates the whole of the desired area (an image display surface) of each of the liquid crystal display panels 18R, 18G, and 18B with even luminance.

A polarization conversion element 13 converts the light from the second integrator lens 12 into predetermined linearly polarized light. The overlapping lens 14 overlaps the images of the respective lens elements of the first integrator lens 11 on the irradiated surfaces of the respective liquid crystal display panels 18R, 18G, and 18B.

A first dichroic mirror 15 reflects the R light input from the overlapping lens 14, and transmits the G light and the B light. The R light reflected by the first dichroic mirror 15 enters the liquid crystal display panel 18R as a spatial light modulation device via a reflecting mirror 16 and a field lens 17R. The liquid crystal display panel 18R modulates the R light in accordance with the image signal.

The second dichroic mirror 21 reflects the G light from the first dichroic mirror 15, and transmits the B light. The G light reflected by the second dichroic mirror 21 enters the liquid crystal display panel 18G as a spatial light modulation device via a field lens 17G. The liquid crystal display panel 18G modulates the G light in accordance with the image signal. The B light transmitted through the second dichroic mirror 21 enters the liquid crystal display panel 18B as a spatial light modulation device via relay lenses 22, 24, reflecting mirrors 23, 25, and a field lens 17B. The liquid crystal display panel 18B modulates the B light in accordance with the image signal.

A cross dichroic prism 19 as a color combining optical system combines the lights modulated by the respective liquid crystal display panels 18R, 18G, and 18B to form the picture light, and makes it proceed to a projection lens 20. The projection lens 20 functions as an emission optical system for emitting the picture light from the main body section 2. It should be noted that it is also possible to adopt reflective liquid crystal display panels as the spatial light modulation devices instead of the transmissive liquid crystal display panels 18R, 18G, and 18B. Further, as the spatial light modulation devices, reflective devices (e.g., a micromirror device) can also be adopted.

Figure 3A:
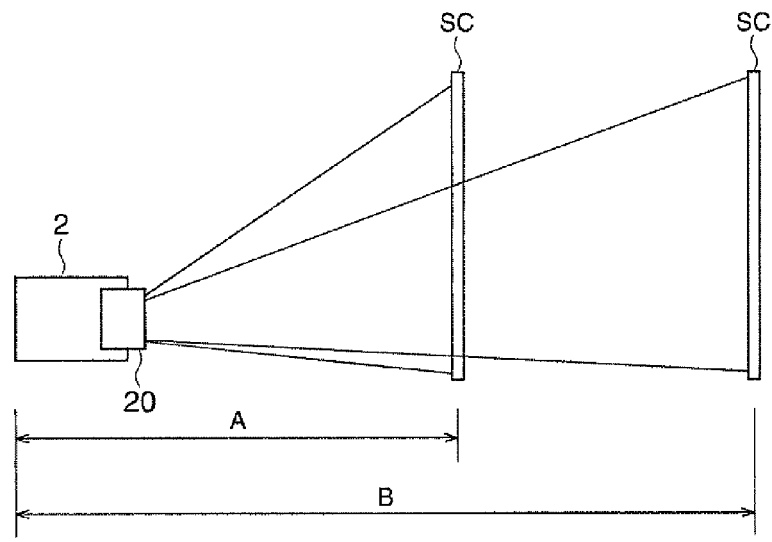
FIG. 3A is a schematic diagram for explaining projection by the main body section alone.

FIG. 3A is a schematic diagram for explaining the projection distance in the case of projecting the picture light with the main body section 2 alone. The main body section 2 is arranged to be detachably attached to the projector 1. The main body section 2 as a unit detached from the projector 1 displays the picture on the irradiated surface using the picture light projected from the projection lens 20. In this case, the main body section 2 is installed with the projection lens 20 facing to the screen SC. It is assumed that the main body section 2 is capable of adjusting the focus in a range of distance from A to B (assuming A<B) with, for example, the same screen size.

Figure 3B:
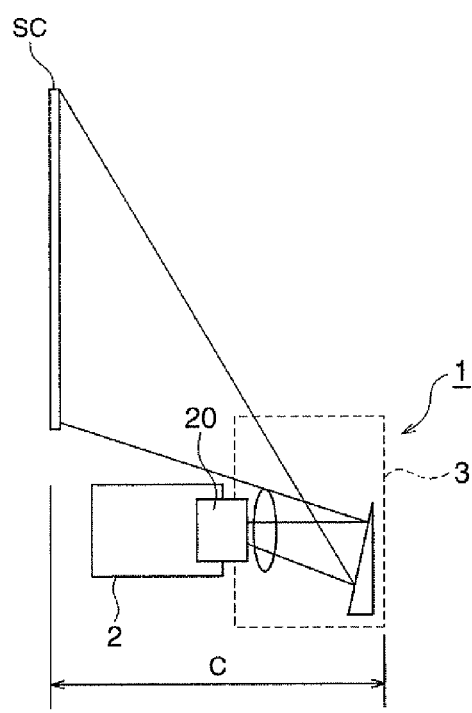
FIG. 3B is a schematic diagram for explaining projection in the case of combining a projection unit to the main body section.

FIG. 3B is a schematic diagram for explaining the projection distance in the case of projecting the picture light with the projection unit 3 combined with the main body section 2. The projector 1 makes the projection unit 3 project the picture light emitted from the projection lens 20 to thereby display the picture on the irradiated surface. On this occasion, the main body section 2 is attached to the projector 1 with the projection lens 20 facing to the projection unit 3 on the opposite side to the screen SC. The projector 1 becomes capable of projection with a distance C shorter than the distance A.

Figure 4:
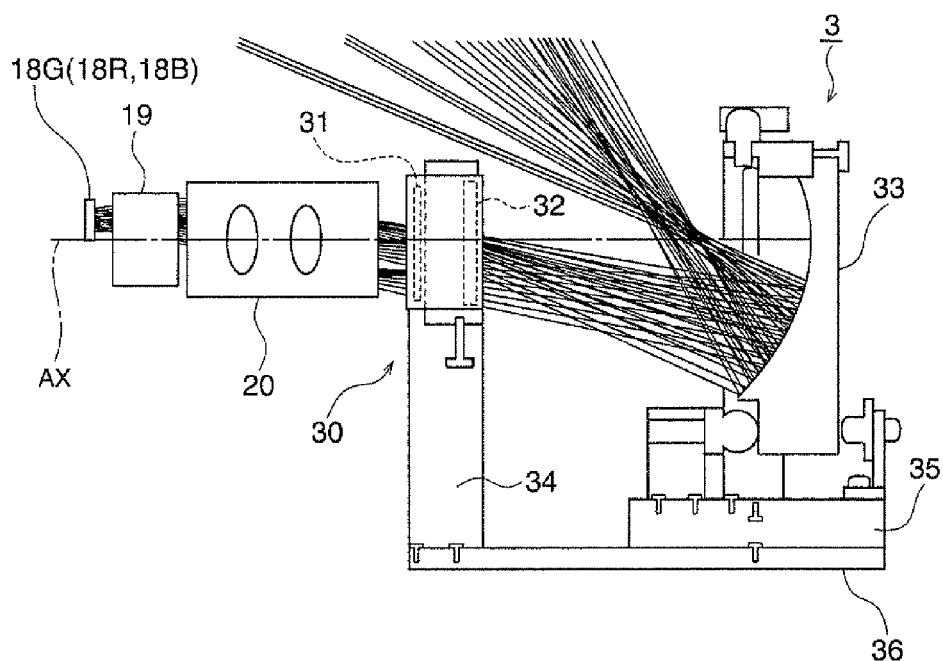
FIG. 4 is a diagram showing a cross-sectional configuration of the projection unit and rays of picture light.

FIG. 4 is a diagram for illustrating a cross-sectional configuration of the projection unit 3, and the rays of the picture light before and after entering the projection unit 3. The projection unit 3 is provided with a first lens 31, a second lens 32, and a angle-widening mirror 33 as optical elements. The first lens 31 and the second lens 32 are disposed at the positions opposed to the projection lens 20. Each of the first lens 31 and the second lens 32 can be formed of, for example, a spherical lens. The first lens 31 and the second lens 32 are supported on a substrate 36 with a lens support section 34.

The angle-widening mirror 33 is disposed at a position where the picture light from the first lens 31 and the second lens 32 enters. The angle-widening mirror 33 is a concave aspheric mirror for reflecting the picture light to thereby make it wide-angle. The angle-widening mirror 33 is supported by the mirror support section 35 on the substrate 36. The first lens 31, the second lens 32, and the angle-widening mirror 33 are positioned via the substrate 36 common thereto, and are fixed.

The angle-widening mirror 33 has a shape of roughly rotational symmetry about the center axis (the optical axis), for example, an aspheric shape obtained by cutting out apart of a cone shape. The axis of symmetry or the optical axis of the angle-widening mirror 33 coincides with the optical axis AX of the projection lens 20. The optical axes of the first lens 31 and the second lens 32 also coincide with the optical axis AX of the projection lens 20. As described above, the projection lens 20, the first lens 31, the second lens 32, and the angle-widening mirror 33 are disposed so that the optical axes AX coincide with each other.

The projection lens 20, the first lens 31, the second lens 32, and the angle-widening mirror 33 make the light modulated in accordance with the image signal proceed while being shifted toward a specific side. Specifically, in the image side, the light is made to proceed while being shifted toward the vertically downside as the specific side with respect to the optical axis AX. The center normal line (equal to the center normal line of the image display surface area of the display surface DS described later) of the image plane virtually formed in the entrance surface of the cross dichroic prism 19 is parallel to the optical axis AX, and is located on the vertically upside which is the opposite side to the specific side with respect to the optical axis AX.

It should be noted that when explaining the projection lens 20 and the projection unit 3, the object side denotes the side of the liquid crystal display panel 18G (18R, 18B), and the image side denotes the side of the image plane IMG or the side of the screen SC.

The main body section 2 is arranged to, for example, have a structure completely separated from the projection unit 3, and to be detachably attached to the projector 1. Further, it is also possible to arrange that the main body section 2 is moved within the projector 1, and is configured integrally with the projection unit 3. In the case of, for example, the middle and long-distance projection, it is also possible to adopt a configuration of moving the main body section 2 to the position where the picture light projected from the projection lens 20 is not blocked by the projection unit 3. In the case of configuring the main body section 2 and the projection unit 3 integrally with each other, for the reason that, for example, the position adjustment between the both members after carrying the projector 1 can be eliminated, it becomes possible to enhance the convenience of the user. It is obvious that it is also possible to fix the main body section 2, and arrange that the projection unit 3 can move to the position where the picture light projected from the projection lens 20 is not blocked by the projection unit 3.

Figure 5:
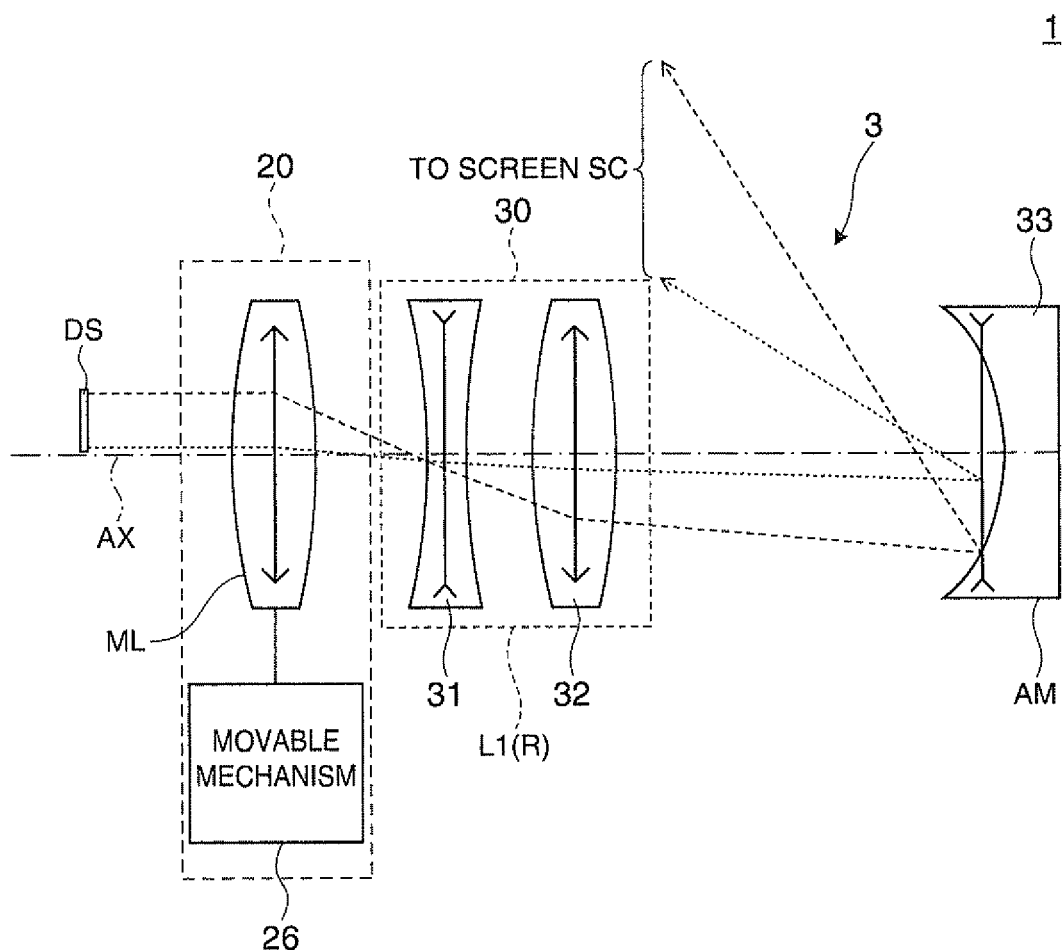
FIG. 5 is a schematic diagram for explaining functions of the respective optical elements shown in FIG. 4.

FIG. 5 is a schematic diagram conceptually showing the optical elements constituting the projection optical system of the projector 1. The projection lens 20 is provided with a master lens ML for enlarged projection, and makes the middle and long-distance projection shown in FIG. 3A possible by itself. The projection unit 3 makes it possible to perform the ultra-short projection with a super short distance to the screen SC not shown disposed above and behind the projection lens 20 in combination with the projection lens 20. Here, the projection unit 3 can be considered while being divided into an adjusting lens L1 corresponding to a refracting optical system 30 and disposed on the master lens ML side, and an aspheric mirror AM corresponding to the angle-widening mirror 33 and located on the screen SC side.

The master lens ML is attached with a movable mechanism 26, and it is arranged that the position of the master lens ML in the optical axis AX can relatively be changed manually or automatically when attaching or detaching the projection unit 3. The adjusting lens L1 in the anterior stage of the projection unit 3 has positive power as a whole, and is provided with the first lens 31 with negative power disposed on the master lens ML side or the light entrance side, and the second lens 32 with positive power disposed on the light exit side. It should be noted that the adjusting lens L1 functions as a contraction optical system R for contracting the intermediate image formed by the master lens ML by moving the image plane by the master lens ML closer to the object side. The aspheric mirror AM has a role of re-imaging the intermediate image, which is formed on the light exit side of the refracting optical system 30, on the screen SC not shown.

In the above configuration, the projection unit 3 is obtained by combining the adjusting lens L1 having relatively weak positive power as a whole, and the aspheric mirror AM having relatively strong positive power with each other, and functions like a Keplerian afocal system to thereby shorten the focal distance and increase the magnification ratio of the image. In other words, the projection unit 3 forms a front converter (on this occasion, a wide converter for angle-widening) with respect to the maser lens ML or the projection lens 20. Here, if it is attempted to constitute the projection unit 3 as the front converter only with the lenses, it becomes difficult to suppress the chromatic aberration, and in the case of attempting to realize the angle-widening not narrower than 130 degrees, occurrence of the chromatic aberration becomes marked. Therefore, it is arranged to constitute the part of the projection unit 3 having strong power by the aspheric mirror AM to thereby prevent the chromatic aberration from occurring. In the case of using such an aspheric mirror AM, since it results that the light is folded by reflection, it is necessary to avoid the interference of the rays in the vicinity of the optical axis AX. Therefore, the display surface DS as the object is shifted from the optical axis AX to thereby arrange the master lens ML, the adjusting lens L1, and the aspheric mirror AM as a shift optical system. It should be noted that the display surface DS corresponds to the image display surface on which the image corresponding to the image signal is formed in each of the liquid crystal display panels 18R, 18G, and 18B of the main body section 2 shown in FIG. 2. Further, in the shift optical system described above, the tendency for the peripheral portion apart from the optical axis AX of each of the optical elements constituting the projection unit 3 to be used is increased, and it results that the screen SC also gets significantly away from the optical axis AX. Therefore, by forming one or more optical element (specifically the aspheric mirror AM) constituting the projection unit 3 and so on so as to have an aspheric shape, the aberration at the position significantly away from the optical axis AX is reduced dramatically.

Figure 6:
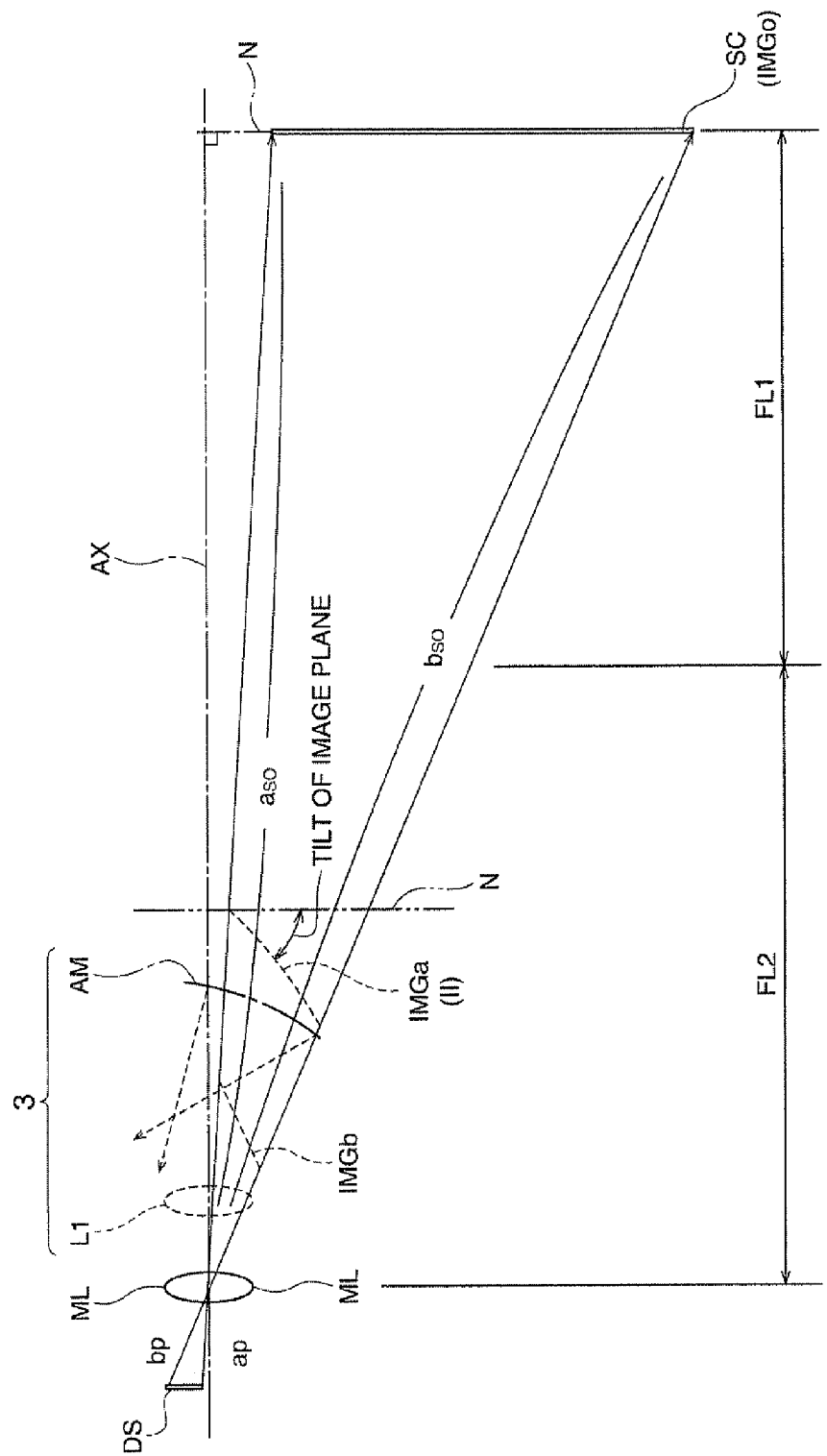
FIG. 6 is a diagram for explaining a relationship between the image height and the ray distance in middle and long-distance projection.

FIG. 6 is a diagram for explaining a relationship between the image height and the ray distance in middle and long-distance projection performed by the master lens ML alone. The image height denotes the height of the image in the vertical direction with reference to the optical axis AX. In the case of the typical middle and long-distance projection performed by the master lens ML alone, the magnification ratio as0/ap in a part with the smallest image height and the magnification ratio bs0/bp in a part with the largest image height take values close to each other, and the image plane IMG0 becomes roughly perpendicular (roughly parallel to the display surface DS) to the optical axis AX.

Figure 7:
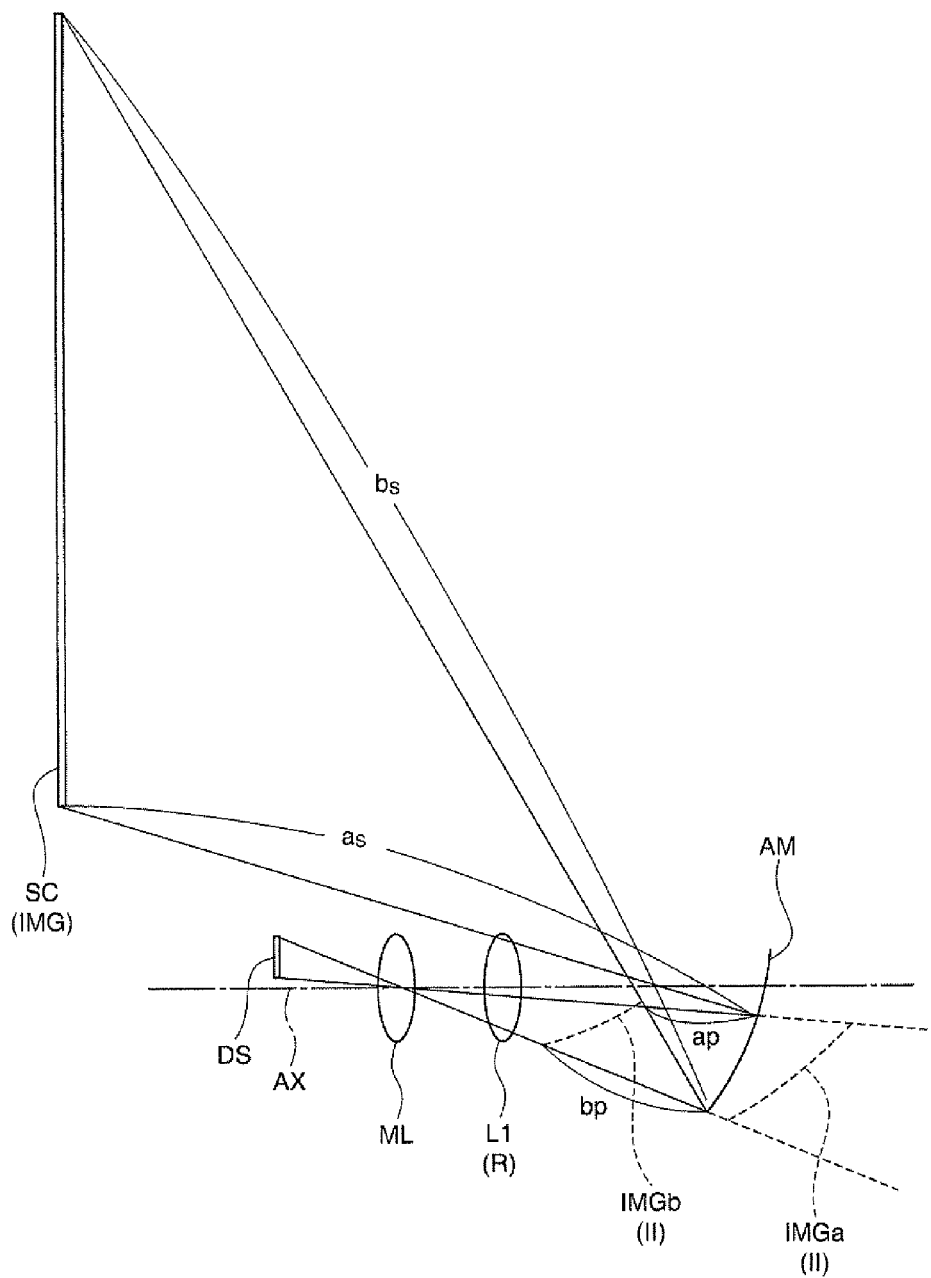
FIG. 7 is a diagram for explaining the case of ultra-short projection.

FIG. 7 is a diagram for explaining the case of the ultra-short projection with a super short distance by the master lens ML added with the projection unit 3. In the case of the ultra-short projection with a super short distance, an intermediate image II of the display surface DS is formed on the image plane IMGb set between the adjusting lens L1 and the aspheric mirror AM by the master lens ML and so on. Although the details will be explained later, in order for forming the intermediate image II at such a position, firstly, the master lens ML is appropriately moved along the direction of the optical axis AX using the movable mechanism 26 so that the intermediate image II of the display surface DS is once formed on the image plane IMGa disposed on the screen SC side from the position where the aspheric mirror AM and so on should be disposed as shown in FIG. 6. Further, by disposing the projection unit 3, the intermediate image II obtained by the master lens ML alone is contracted by the adjusting lens L1 functioning as the contraction optical system R, and the position of the image plane IMGa by the master lens ML alone is shifted to the position of the image plane IMGb on the image side of the aspheric mirror AM. It should be noted that if the intermediate image II can be formed on the image plane IMGb on the image side of the aspheric mirror AM by the shift of the master lens ML, it becomes unnecessary to provide the adjusting lens L1 with the function as the contraction optical system R.

The aspheric mirror AM includes an aspheric shape expressed by the following polynomial h. Here, it is assumed that "y" denotes the height (the image height) of the image from the optical axis AX, "c" denotes the curvature of the spherical surface used as a reference of the shape of the aspheric mirror AM, "k" denotes the conic constant, A2, A4, A6, A8, A10, . . . respectively denote predetermined correction terms.

$$h = \frac{cy^2}{1+\sqrt{1-(1+k)c^2y^2}} + A_2y^2 + A_4y^4 + A_6y^6 + A_8y^8 + A_{10}y^{10} + \ldots$$

The fractional term of the polynomial is a term for representing the aspheric shape to be the reference, and represents a spherical shape in the case of k=0. The correction terms represent the shift from the reference aspheric shape. The polynomial described above expresses an aspheric shape rotationally symmetric about the center axis even if the reference aspheric shape is corrected by the correction terms. It should be noted that it is assumed that the number of correction terms in the polynomial h is arbitrary.

If the picture light is made wide-angle, since generally, the further the periphery is located from the optical axis AX, the more easy it becomes for the aberration such as distortion to occur, the design for dramatically reducing the aberration in the periphery is particularly required. In the present embodiment, since the correction terms are included in the polynomial h expressing the shape of the aspheric mirror AM, it becomes possible to perform the correction of the shape corresponding to the height y from the optical axis AX on a quadratic curve defined by c and k. Since a power of y is multiplied in each of the correction terms, it results that the greater the value of y in the portion is, the more effectively the portion is corrected. Therefore, even if the master lens ML is made short-focus using the projection unit 3 including the aspheric mirror AM and so on, it becomes possible to realize a high-performance optical system having extremely small aberration such as distortion in the periphery. It should be noted that the formula expressing the shape of the aspheric mirror AM is not limited to what is explained in the present embodiment, but can arbitrarily be modified. Further, the shape of the angle-widening mirror 33 can be a free-form surface expressed by an XY polynomial.

Figure 8:
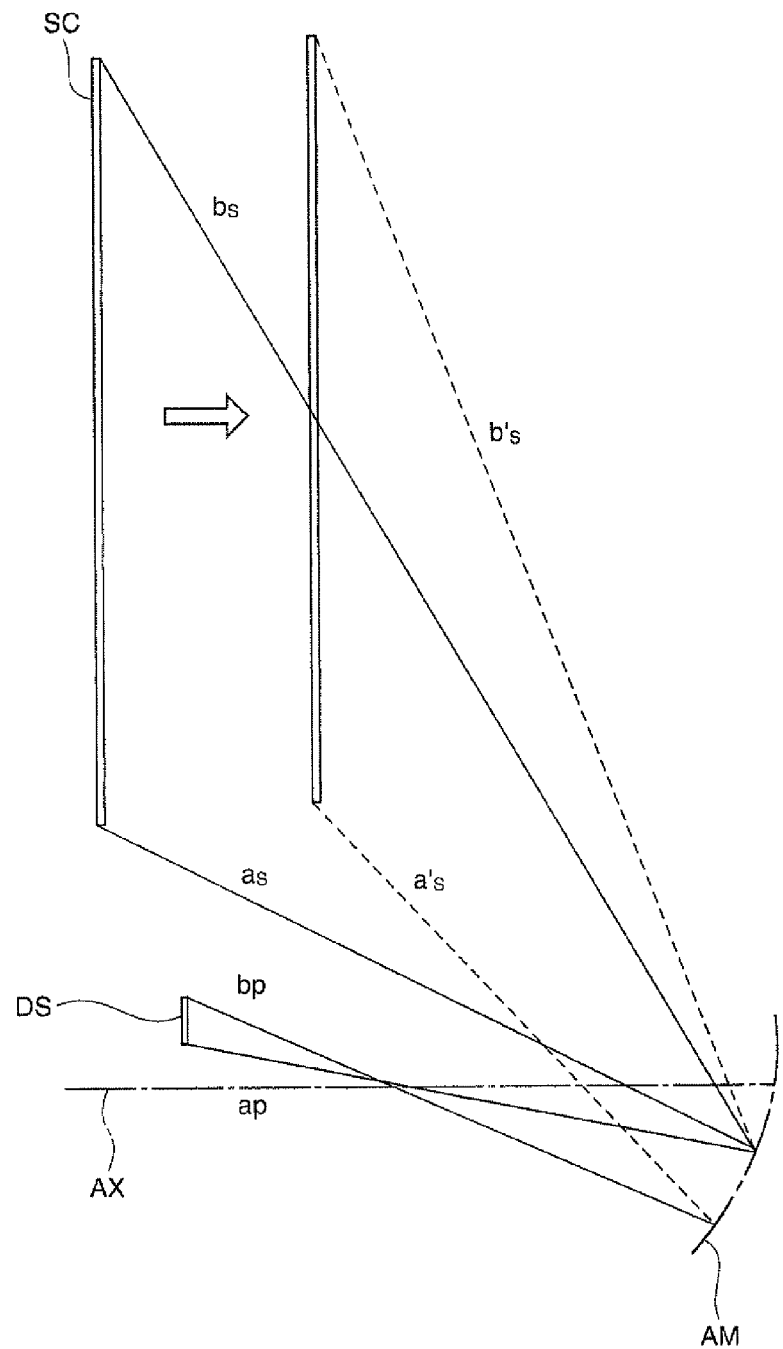
FIG. 8 is a diagram for explaining reduction of the distance and the variation in the ray distance.

As shown in FIG. 8, as the screen SC and the aspheric mirror AM are made closer to each other, the distance of the rays changes from bs to bs' in the portion with the maximum image height. Regarding the portion with the large image height, by adjusting the polynomial expressing the shape of the aspheric mirror AM so as to vary the distance of the rays as described above, the effective correction becomes possible. If the reduction of distance is made to proceed, it becomes necessary to perform the correction of changing the distance of the rays from as to as' not only on the portion with a large image height but also on the portion with a small image height. The smaller the image height of the portion is, the more difficult it becomes to perform the correction using the polynomial of the aspheric mirror AM described above on the portion. Therefore, in the present embodiment, it is assumed that the aberration correction is performed on the portion with a small image height using the optical characteristics of the master lens ML instead of the aberration correction by the aspheric mirror AM.

Hereinafter, the optical characteristics of the master lens ML in the present embodiment will be explained with reference to FIG. 6. The image plane by the master lens ML is erected or inverted roughly perpendicularly to the optical axis AX (roughly parallel to the display surface DS) in the imaging range as a range further than a predetermined distance, and is tilted with respect to the normal line N of the optical axis AX in the range closer than the imaging range. The master lens ML performs the middle and long-distance projection by itself using a first range FL1 in which the image plane is erected or inverted in parallel to the display surface DS. Further, the master lens ML forms the image plane IMGa tilted with respect to the normal line N as indicated by the heavy broken line in the drawing in a second range FL2 located nearer to the master lens ML than the first range FL1, and uses it for the ultra-short projection with a super short-distance.

Figure 9A:
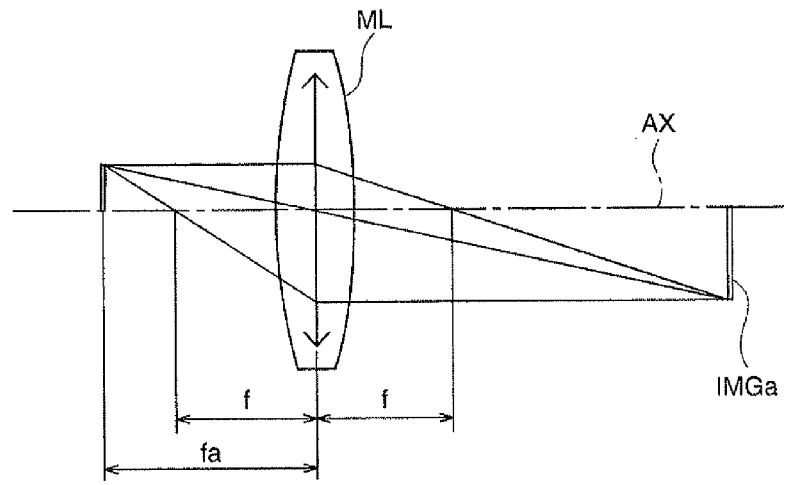
FIGS. 9A and 9B are diagrams for explaining a method of obtaining an image plane, which is tilted, using a master lens.
Figure 9B:
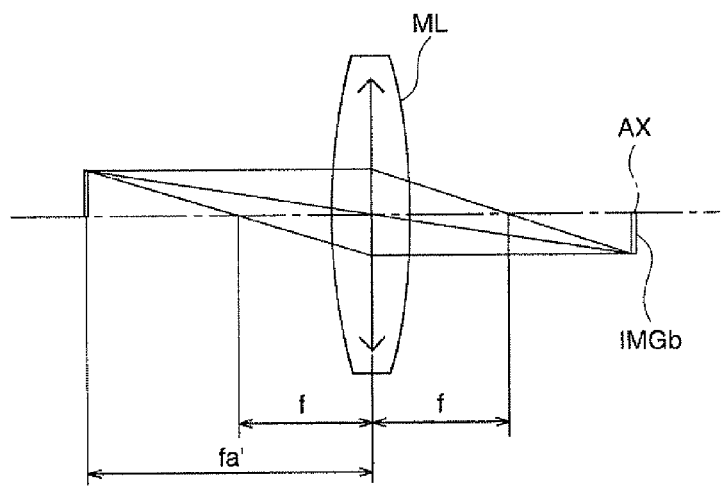

FIGS. 9A and 9B are diagrams for explaining a method of obtaining an image plane, which is tilted, using the master lens ML. FIG. 9A shows the case (a first mode) of the middle and long-distance projection setting the back focus to fa. The first mode is a mode for displaying an image on the irradiated surface by the main body section 2, namely the master lens ML alone, and corresponds to a normal display state. FIG. 9B shows the case (a second mode) of the ultra-short projection with a super short distance setting the back focus to fa' (fa<fa'). The second mode is a mode for displaying an image on the irradiated surface by the combination of the main body section 2 and the projection unit 3, and corresponds to a macro display state.

Figure 10:
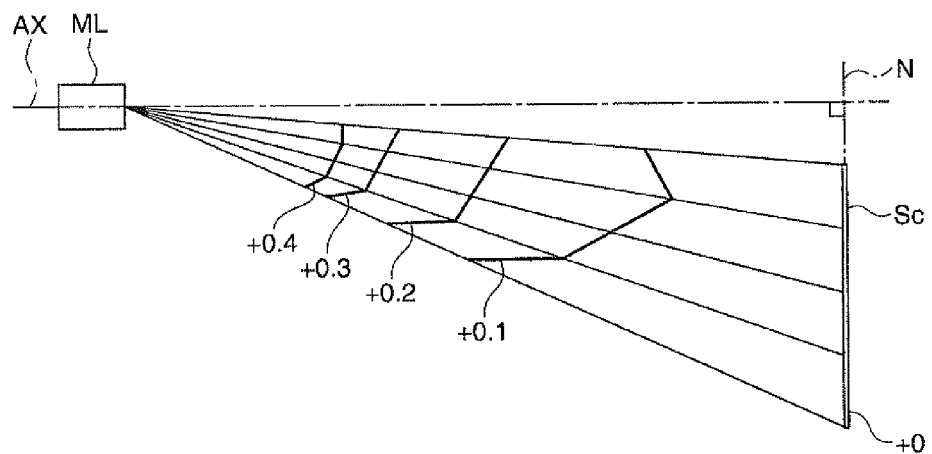
FIG. 10 is a diagram for explaining back focus and the tilt of the image plane.

In the second mode (the macro display state), the master lens ML is shifted in the direction of the optical axis AX using the movable mechanism 26 shown in FIG. 5 so that the back focus is elongated with respect to the normal position of the master lens ML in the first mode (the normal display state). If the paraxial imaging position is shifted toward the master lens ML, it generally results that the tilt occurs in the image plane by the picture light distant from the optical axis AX. For example, as shown in FIG. 10, the tilt of the image plane irregularly appears as the back focus is increased from +0, and the image plane is completely tilted with respect to the normal line N with the back focus around +0.4 or +0.3.

By manufacturing the master lens ML in advance so as to be able to realize the second mode for the super short-distance projection, a high optical performance can be exerted when combining the main body 2 provided with the master lens ML and so on with the projection unit 3 provided with the aspheric mirror AX and so on. By making it possible to switch between the modes with a simple operation of shifting the master lens ML inside the main body section 2 in the optical axis AX direction, the simple and accurate configuration can be realized with little increase in cost. It should be noted that the method of obtaining the image plane IMGa tilted as shown in FIG. 6 and so on by the master lens ML is not limited to the case of shifting the master lens ML in the optical axis AX direction. It is also possible to arrange that the image plane IMGa tilted is obtained by varying the tilt of at least one lens constituting the master lens ML. Also in this case, the switching between the modes with a simple operation is possible. It should be noted that as already explained in the second mode, the image plane IMGa is contracted to the image plane IMGb one-size smaller than the image plane IMGa and is disposed in front of the aspheric mirror AM by the contraction optical system R. By being reflected by the aspheric mirror AM, the picture light from the image plane IMGb thus contracted is erected or inverted in roughly parallel to the display plane DS and is imaged on the screen SC roughly perpendicular to the optical axis AX (see FIG. 7).

Hereinafter, the functions of the projection unit 3 and the projection lens 20 constituting the projector 1 will be explained in detail with reference to FIG. 5 and so on. The projection lens 20 corresponding to the master lens ML is capable of forming the image plane IMGa (see FIG. 6) tilted with respect to the normal line N of the optical axis AX. The projection lens 20 has a function of correcting the aberration particularly in the portion with small image height. The projection unit 3, namely the first lens 31, the second lens 32, and the angle-widening mirror 33, functions as a front converter for magnifying the image.

It should be noted that since in the present embodiment, the shift optical system is adopted as the projection unit 3 functioning as the front converter, it results that the focal position is slightly shifted when performing projection on the screen SC. With respect to the various aberrations caused therefrom, it is possible to take measures of the correction by the angle-widening mirror 33 or using a lens for reducing the aberrations together therewith. Further, it is also possible for the first lens 31 and the second lens 32 constituting the refracting optical system 30 to be provided with a function of correcting the aberrations by adopting the aspheric lens instead of the spherical lens. By thus combining a plurality of optical elements provided with the aberration correction function, it becomes possible to fulfill the high-performance optical specifications. In particular, by adopting an aspheric lens or a free-form surface lens instead of the spherical lens in the lens group constituting the refracting optical system 30, it is also possible to reduce the number of lenses or to miniaturize the lenses. Thus, the cost reduction and the miniaturization of the mirror frame become possible.

The first lens 31 as an optical element with negative power and the second lens 32 as an optical element with positive power function as the contraction optical system R for contracting the image plane IMGa thus tilted due to the projection lens 20 in an area between the projection lens 20 and the angle-widening mirror 33 (AM). In other words, the contraction optical system R provided with the first lens 31 and the second lens 32 functions as a variable power optical system for varying the magnification with respect to the image forming the image plane IMGa tilted to the normal line N of the optical axis AX.

The angle-widening mirror 33 corresponding to the aspheric mirror AM folds the picture light so that the image plane IMGb (see FIG. 7) contracted by the contraction optical system R becomes roughly parallel to the irradiated surface of the screen SC, and then projects it in an enlarged manner. Further, the angle-widening mirror 33 has a function of correcting the aberration particularly in the portion with large image height.

The angle-widening mirror 33 is formed to have a shape roughly rotationally symmetric about the center axis to thereby make it easy to align the optical axis AX with other constituents (the projection lens 20 and the refracting optical system 30). Further, the angle-widening mirror 33 can be worked using a lathe or the like, and can therefore be manufactured easily with high accuracy. By adopting a coaxial optical system, it is possible for the projector 1 to adopt a normal design approach for the coaxial optical system. Therefore, it is possible to reduce the design manpower of the optical system and to realize an optical system with reduced aberration.

Since the present embodiment adopts the configuration of disposing a plurality of optical elements along the optical axis AX at predetermined intervals, assembling can be made easy by aligning the optical axis AX, and it becomes also possible to realize a high performance. In particular, when attaching or detaching the main body section 2, it results that a highly accurate alignment between the projection lens 20 of the main body section 2 and each of the optical elements of the projection unit 3 is required. By making the optical axis AX common, it is possible to make it easy to perform the alignment between the optical elements on the main body section 2 side and the optical elements on the projection unit 3 side. In the case of the coaxial optical system, the variation in the optical performance from the optical axis AX toward the periphery can be made gentle compared to the variation in the optical performance in the eccentric optical system. Therefore, since it becomes possible to provide a certain level of margin to the alignment accuracy, it becomes possible to realize a configuration suitable to the invention.

According to the above, it becomes possible to realize the ultra-short projection with a super short distance and the middle and long-distance projection by the single projector 1 without deteriorating the quality of the image. The single projector 1 can cover the wide projection distance ranging from a super short distance to a middle and long distance. It should be noted that it is also possible to assume that the projection unit 3 of the present embodiment is combined with a projector of an existing projection type. By applying the projection unit 3 to an existing projector provided with a projection lens capable of forming an image of an image plane tilted within the second range FL2 shown in FIG. 6, the ultra-short projection substantially the same as in the present embodiment can be realized.

The projection unit 3 is only required to have at least the angle-widening mirror 33, and can arbitrarily be modified. For example, the function of the first lens 31 or the functions of both of the first lens 31 and the second lens 32 can also be arranged to be provided to the optical system of the main body section 2 such as the projection lens 20. Also in this case, the projector 1 can perform the ultra-short projection.

Specific Example

Figure 11:
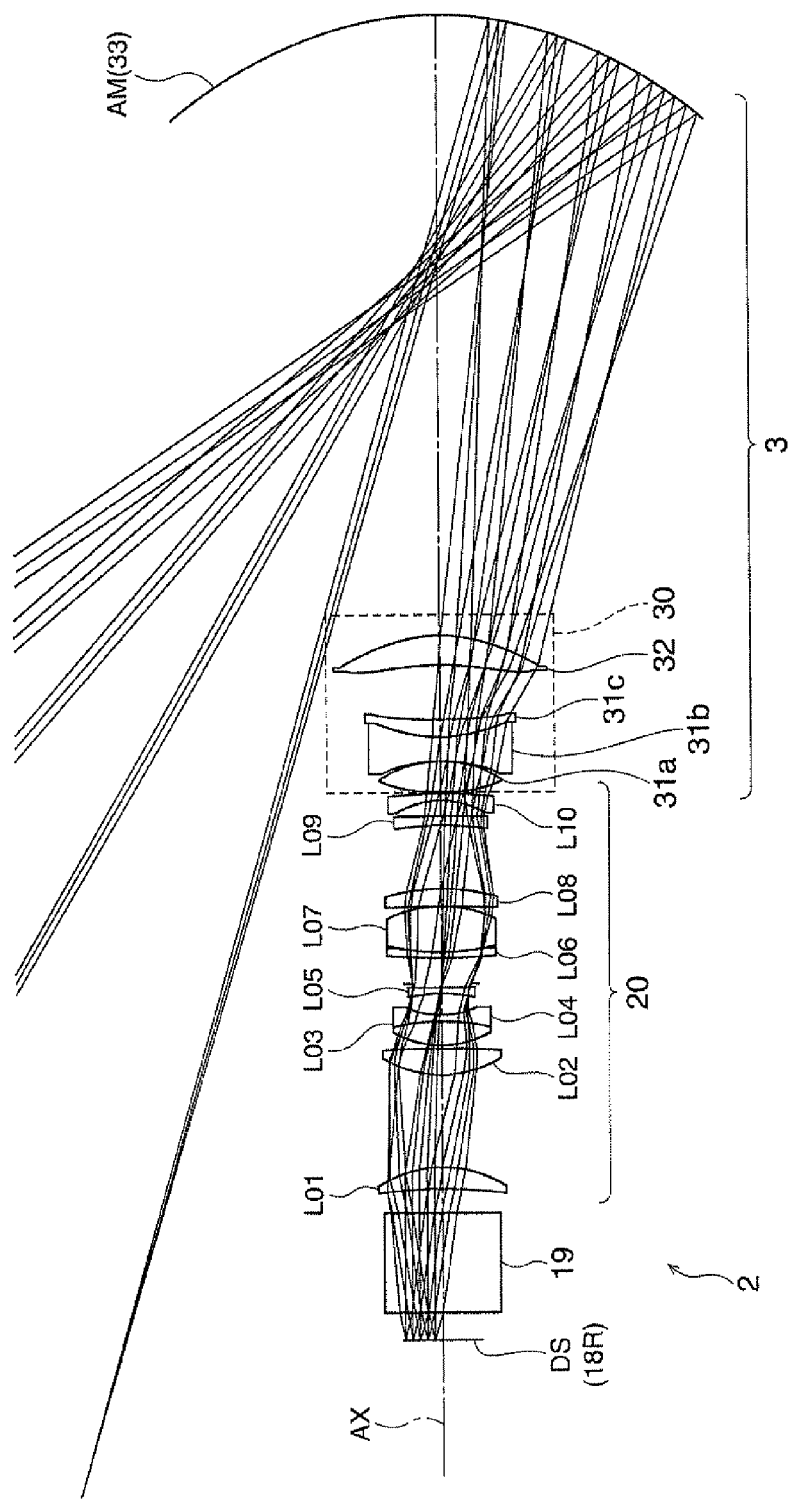
FIG. 11 is a diagram for explaining the optical system of a specific example of the first embodiment.
Figure 12:
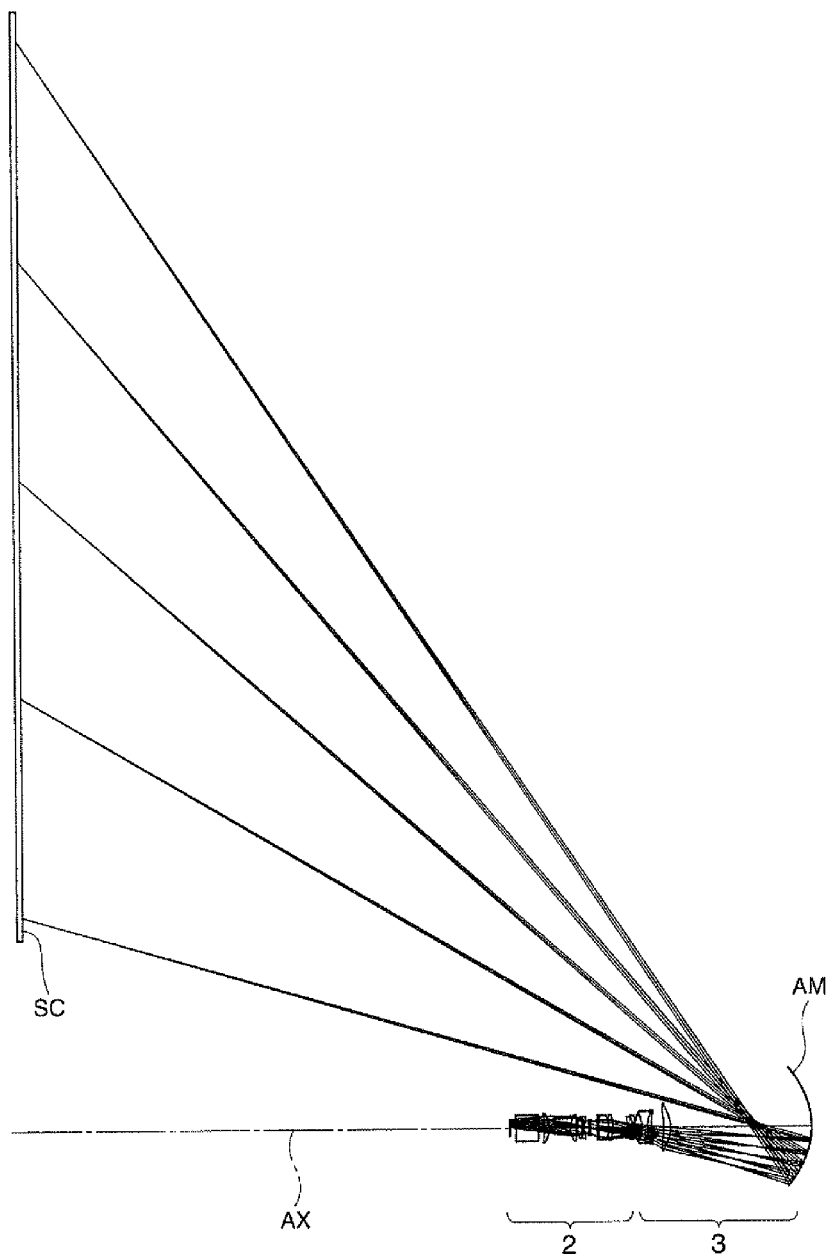
FIG. 12 is a diagram for explaining the ultra-short projection by the optical system of the specific example shown in FIG. 11.

FIGS. 11 and 12 are diagrams for explaining a specific example of the ultra-short projection by the combination of the projection lens 20 in the second mode and the projection unit 3. Here, the projection lens 20 has lenses L01 through L10. Further, the projection unit 3 has the first and second lenses 31, 32, and the angle-widening mirror 33. Among these components, the first lens 31 includes three lenses 31*a*, 31*b*, and 31*c*.

Table 1 below shows lens data and so on of the specific example. In Table 1, "SURFACE NUMBER" denotes the number assigned to each of the surfaces of the lenses sequentially from the display surface DS side. Further, "SURFACE TYPE" indicates whether the surface is spherical or aspheric, or the fact that the surface is a reflecting surface, "R" represents the curvature radius, and "D" represents the lens thickness or the air space from the subsequent surface. Further, "Nd" represents the refractive index in the d-line of the lens material, and "vd" represents the dispersion of the lens material.

TABLE 1

| SURFACE NUMBER | SURFACE TYPE | R: CURVATURE RADIUS | D: SURFACE INTERVAL | Nd | vd |
|---|---|---|---|---|---|
| OBJECT | SPHERICAL | INFINITE | 7.1929 | | |
| 1 | SPHERICAL | INFINITE | 25.7500 | 1.516800 | 64.2 |
| 2 | SPHERICAL | INFINITE | 6.0000 | | |
| 3 | SPHERICAL | −158.3124 | 5.4000 | 1.589130 | 61.2 |
| 4 | SPHERICAL | −30.3217 | 23.9376 | | |
| 5 | SPHERICAL | 27.5882 | 6.8760 | 1.696800 | 55.4 |
| 6 | SPHERICAL | −207.1157 | 0.7212 | | |
| 7 | SPHERICAL | 24.4661 | 6.3000 | 1.487490 | 70.4 |
| 8 | SPHERICAL | −43.8787 | 1.3000 | 1.805180 | 25.4 |
| 9 | SPHERICAL | 21.3563 | 5.6116 | | |
| 10 | SPHERICAL | −41.4060 | 1.4000 | 1.834000 | 37.3 |
| 11 | ASPHERIC | 180.8211 | 1.0639 | | |
| APERTURE SURFACE | SPHERICAL | INFINITE | 7.3060 | | |
| 13 | SPHERICAL | 207.7320 | 1.3000 | 1.806100 | 33.2 |
| 14 | SPHERICAL | 47.1046 | 11.5471 | 1.744000 | 44.9 |
| 15 | SPHERICAL | −31.9160 | 0.1000 | | |
| 16 | SPHERICAL | −284.1975 | 4.3186 | 1.805180 | 25.4 |
| 17 | SPHERICAL | −49.4235 | 16.7773 | | |
| 18 | ASPHERIC | −40.9261 | 2.2000 | 1.531160 | 56.0 |
| 19 | ASPHERIC | −170.8767 | 3.9060 | | |
| 20 | SPHERICAL | −20.3540 | 1.8000 | 1.696800 | 55.4 |
| 21 | SPHERICAL | −125.9050 | 0.1000 | | |
| 22 | SPHERICAL | 52.2202 | 8.0000 | 1.496583 | 65.1 |
| 23 | SPHERICAL | −31.7923 | 0.1000 | | |
| 24 | SPHERICAL | −35.9710 | 6.0000 | 1.743972 | 44.8 |
| 25 | SPHERICAL | 44.0299 | 0.1000 | | |
| 26 | ASPHERIC | 47.9589 | 4.5268 | 1.492000 | 57.2 |
| 27 | ASPHERIC | −471.3569 | 13.7855 | | |
| 28 | ASPHERIC | −73.0640 | 7.3931 | 1.492000 | 57.2 |
| 29 | ASPHERIC | −50.9036 | 159.7585 | | |
| 30 | ASPHERIC | −88.9269 | −900.0000 | | |

In the specific example, although the projection lens 20 and the projection unit 3 are basically formed of a spherical surface, the exit surface of the fifth lens L05, the entrance and exit surfaces of the ninth lens L09, the entrance and exit surfaces of a lens 31c included in the first lens 31, the entrance and exit surfaces of the second lens 32, and the angle-widening mirror 33 are formed of an aspheric surface. The displacement of the aspheric shape from the surface apex in the optical axis AX direction is provided as the polynomial h described above. The values of the conic constant "k," and the higher-order correction terms "A2" through "A10" of the aspheric surface constituting the specific example are as shown in Table 2 below.

TABLE 2

| PARAMETER | VALUE | PARAMETER | VALUE |
|---|---|---|---|
| 11th SURFACE | | 18th SURFACE | |
| Y CURVATURE RADIUS | 180.8211 | Y CURVATURE RADIUS | −40.9261 |
| CONIC CONSTANT (k) | −84.6795 | CONIC CONSTANT (k) | −2.2501 |
| 4th-ORDER COEFFICIENT (A) | 2.3252e−005 | 4th-ORDER COEFFICIENT (A) | 1.1148e−005 |
| 6th-ORDER COEFFICIENT (B) | 2.3671e−008 | 6th-ORDER COEFFICIENT (B) | 1.0075e−007 |
| 8th-ORDER COEFFICIENT (C) | −1.0855e−010 | 8th-ORDER COEFFICIENT (C) | −1.6126e−010 |
| 10th-ORDER COEFFICIENT (D) | 0.0000 | 10th-ORDER COEFFICIENT (D) | 3.3999e−013 |
| 19th SURFACE | | 26th SURFACE | |
| Y CURVATURE RADIUS | −170.8767 | Y CURVATURE RADIUS | 47.9589 |
| CONIC CONSTANT (k) | 0.0000 | CONIC CONSTANT (k) | 0.0000 |
| 4th-ORDER COEFFICIENT (A) | 4.3174e−006 | 4th-ORDER COEFFICIENT (A) | 2.6514e−006 |
| 6th-ORDER COEFFICIENT (B) | 7.2928e−008 | 6th-ORDER COEFFICIENT (B) | 3.2174e−008 |
| 8th-ORDER COEFFICIENT (C) | 0.0000 | 8th-ORDER COEFFICIENT (C) | 3.9220e−011 |
| 10th-ORDER COEFFICIENT (D) | 0.0000 | 10th-ORDER COEFFICIENT (D) | −4.6581e−013 |
| 27th SURFACE | | 28th SURFACE | |
| Y CURVATURE RADIUS | −471.3569 | Y CURVATURE RADIUS | −73.0640 |
| CONIC CONSTANT (k) | 0.0000 | CONIC CONSTANT (k) | 0.0000 |
| 4th-ORDER COEFFICIENT (A) | 8.7403e−006 | 4th-ORDER COEFFICIENT (A) | 2.6466e−006 |
| 6th-ORDER COEFFICIENT (B) | 5.7564e−008 | 6th-ORDER COEFFICIENT (B) | 3.7889e−009 |
| 8th-ORDER COEFFICIENT (C) | 9.1345e−011 | 8th-ORDER COEFFICIENT (C) | 1.3565e−011 |
| 10th-ORDER COEFFICIENT (D) | −6.3361e−013 | 10th-ORDER COEFFICIENT (D) | −1.1329e−014 |
| 29th SURFACE | | 30th SURFACE | |
| Y CURVATURE RADIUS | −50.9036 | Y CURVATURE RADIUS | −88.9269 |
| CONIC CONSTANT (k) | 0.0000 | CONIC CONSTANT (k) | −0.4728 |
| 4th-ORDER COEFFICIENT (A) | −3.6352e−006 | 4th-ORDER COEFFICIENT (A) | 1.1411e−007 |
| 6th-ORDER COEFFICIENT (B) | 2.2595e−009 | 6th-ORDER COEFFICIENT (B) | 7.6330e−013 |
| 8th-ORDER COEFFICIENT (C) | −1.7168e−011 | 8th-ORDER COEFFICIENT (C) | −5.1217e−016 |
| 10th-ORDER COEFFICIENT (D) | 2.8935e−014 | 10th-ORDER COEFFICIENT (D) | 9.4217e−020 |

FIG. 12 shows the projection state to the screen SC in the case of connecting the projection unit 3 to the main body section 2. As is obvious from the drawing, the ultra-short projection is performed on the screen SC in a preferable imaging state.

Figure 13:
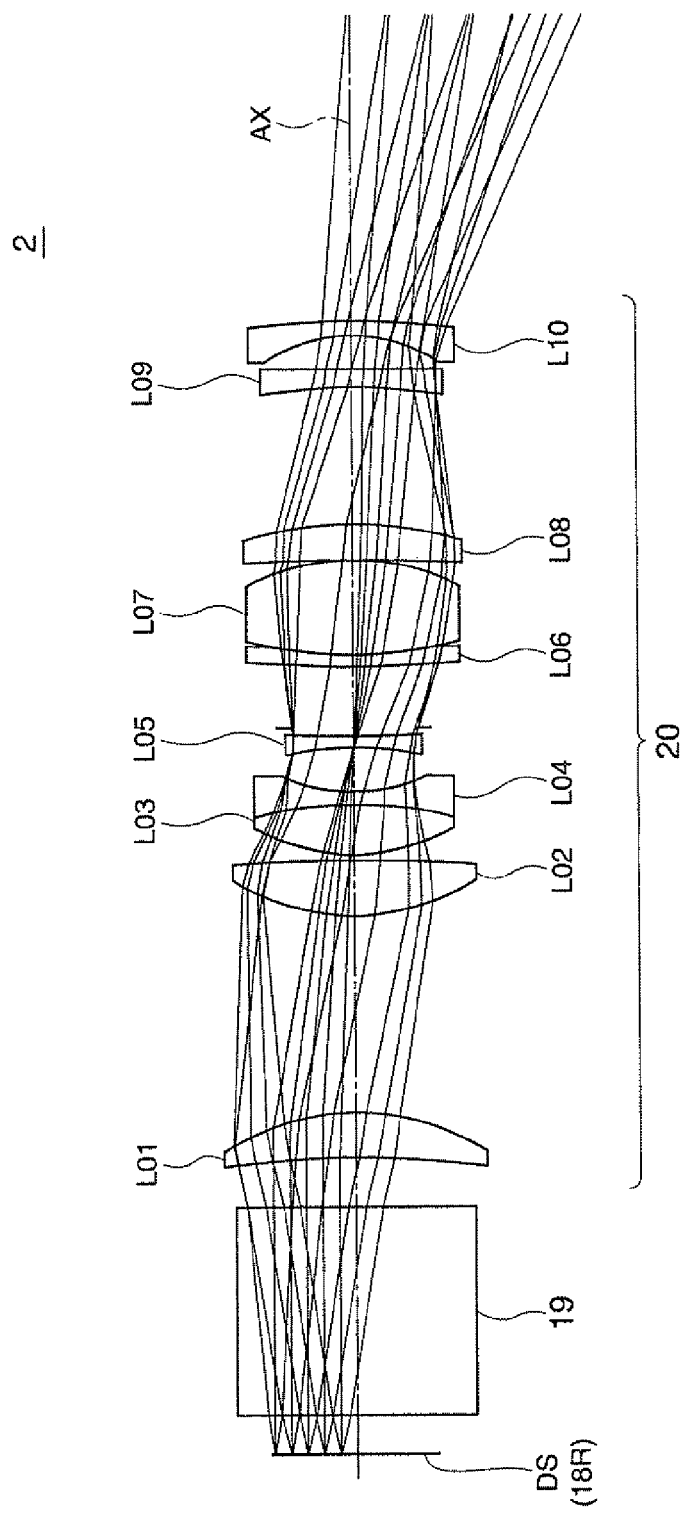
FIG. 13 is a diagram showing a state in which the projection unit is separated from the main body section.

FIG. 13 shows the state in which the projection unit 3 is separated from the main body section 2, and the projection lens 20 is set to the first mode. On this occasion, compared to the state shown in FIG. 11, the first lens L01 through the tenth lens L10 are integrally moved to the object side to thereby be set to the normal display state.

Figure 14:
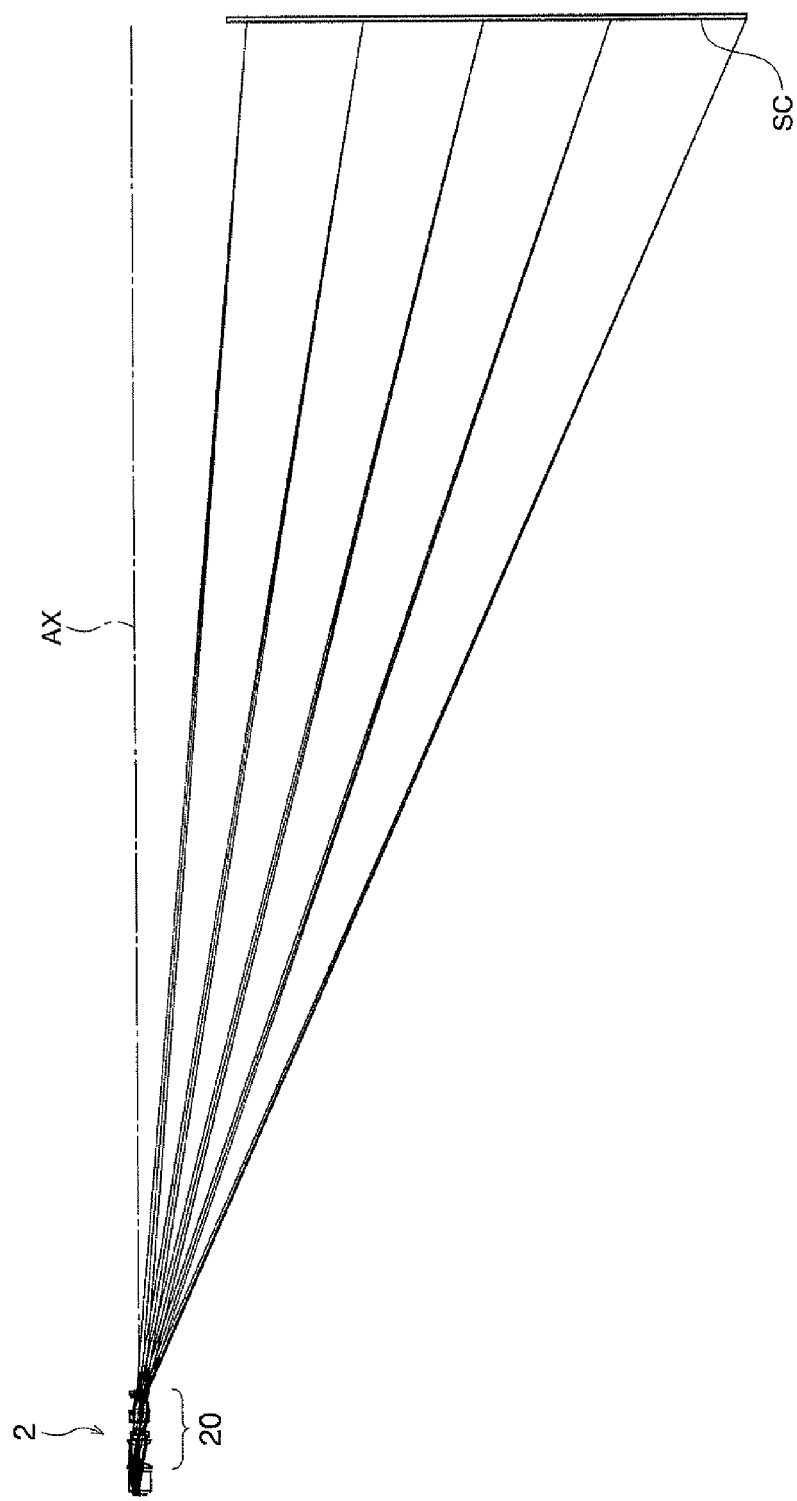
FIG. 14 is a diagram for explaining the middle and long-distance projection in the case in which the projection unit is separated from the main body section.

FIG. 14 corresponds to FIG. 13, and shows the projection state to the screen SC in the case of separating the projection unit 3 from the main body section 2. On this occasion, the projection lens 20 is set to the normal display mode. As is obvious from the drawing, the ultra-short projection is performed on the screen SC in a preferable imaging state by the projection lens 20 alone.

Figure 15:
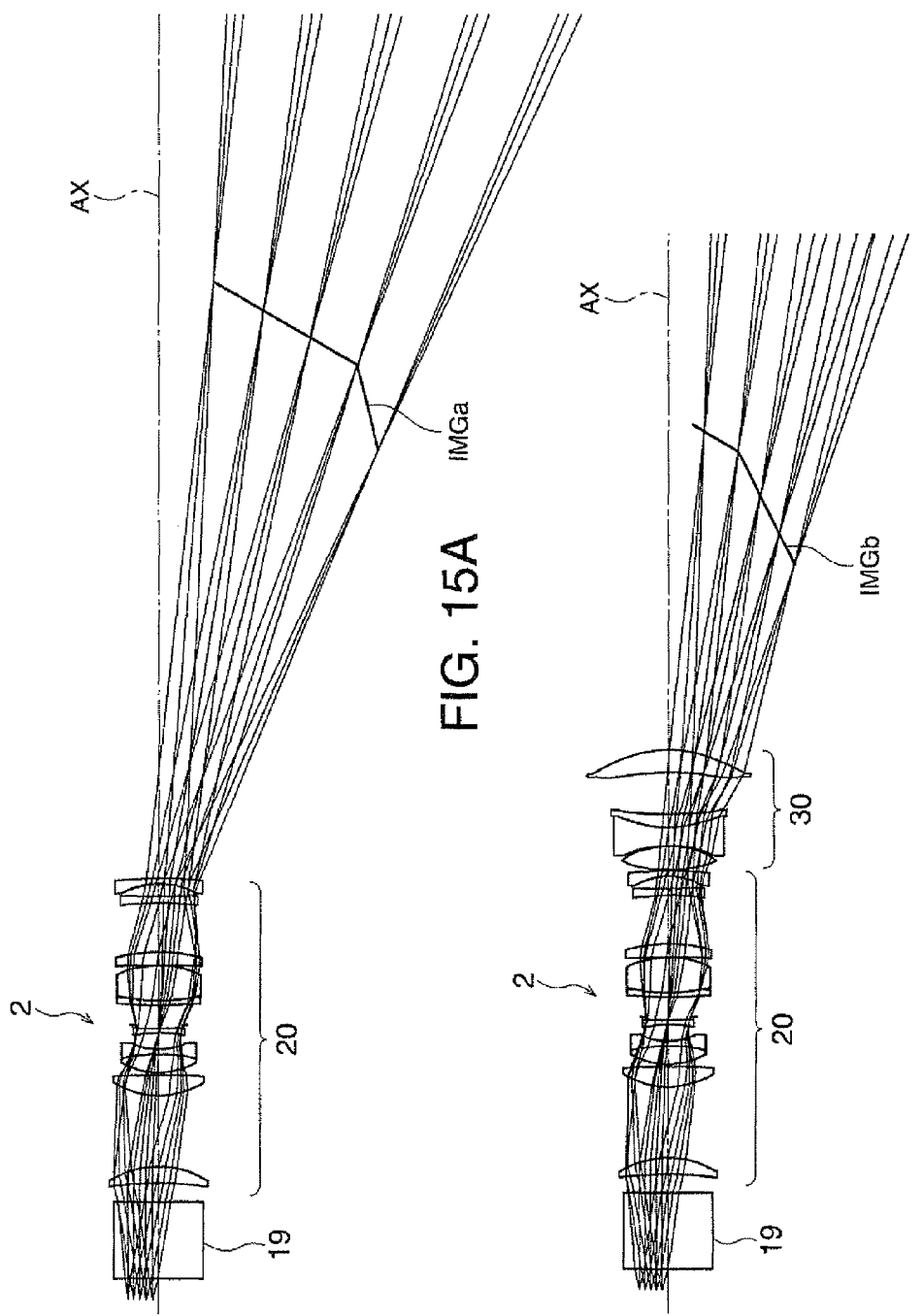
FIG. 15A is a diagram showing a state of eliminating the projection unit from the system shown in FIG. 11.
FIG. 15B is a diagram showing a state of partially eliminating the projection unit from the system shown FIG. 11.

FIG. 15A shows the case in which the projection unit 3 is eliminated from the state shown in FIG. 12 or FIG. 11, and the projection lens 20 is kept in the macro display state. It is understood therefrom that the image plane IMG is not imaged on the screen SC in front, but the image plane IMGa is imaged at the position near to the projection lens 20.

FIG. 15B is a diagram showing the imaging state in the case in which the projection lens 20 is in the macro display state, and only the angle-widening mirror 33 out of the projection unit 3 is eliminated while keeping the refracting optical system 30. It is understood that by disposing the refracting optical system 30 in such a manner, the image plane IMGb significantly tilted is formed at a position relatively near to the projection lens 20.

Second Embodiment

Figure 16:
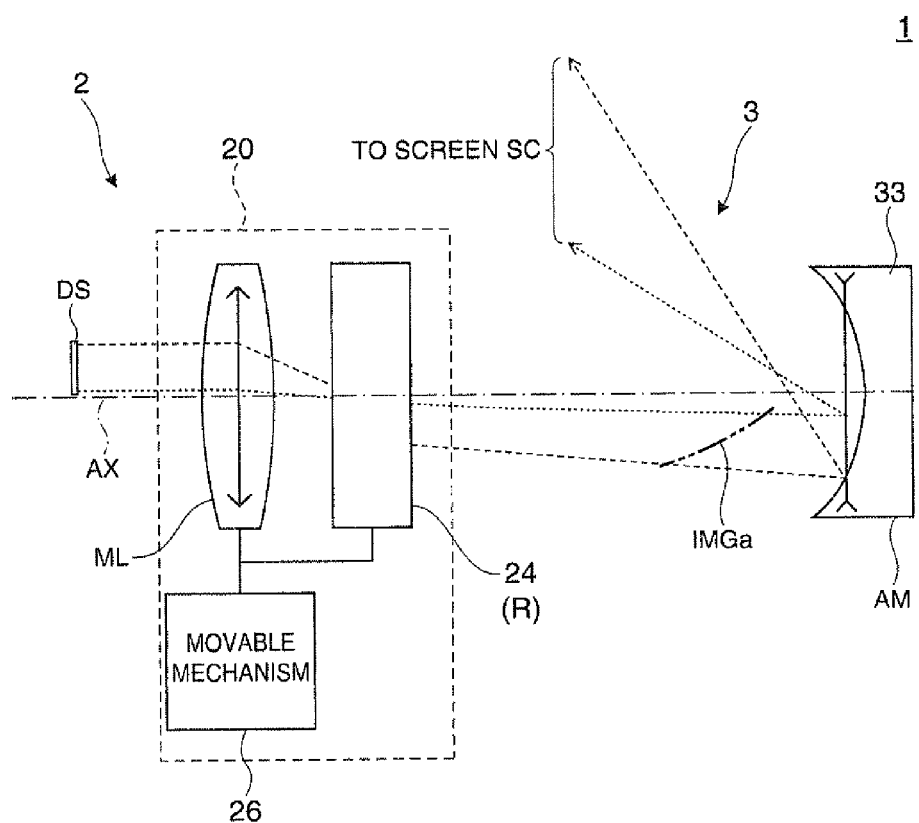
FIG. 16 is a schematic diagram of optical elements of the projector according to a second embodiment of the invention.

FIG. 16 is a schematic diagram for functionally explaining each of the optical elements of the projector according to a second embodiment of the invention. In the case of the present embodiment, the refracting optical system 30 functioning as the contraction optical system R is omitted from the projection unit 3, and a lens portion 24 functioning as the contraction optical system R is disposed in the projection lens (an emission optical system) 20. Thus, the image plane IMGa appropriately tilted with respect to the display surface DS and the optical axis AX can be formed in the anterior of the aspheric mirror AM, and the ultra-short projection can be performed on the screen SC in a preferable imaging state.

Third Embodiment

Figure 17:
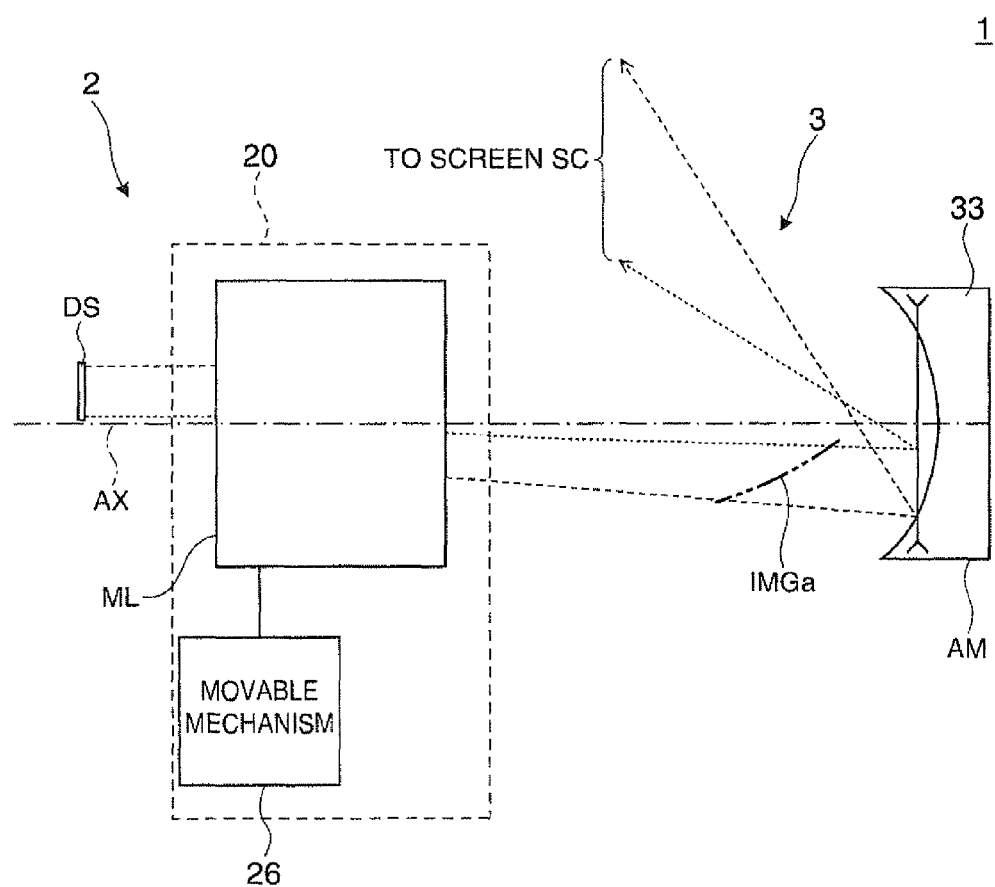
FIG. 17 is a schematic diagram of optical elements of the projector according to a third embodiment of the invention.

FIG. 17 is a schematic diagram for functionally explaining each of the optical elements of the projector according to a third embodiment of the invention. In the case of the present embodiment, it is arranged that the refracting optical system 30 functioning as the contraction optical system R is omitted from the projection unit 3, and the projection lens (the emission optical system) 20 forms the image plane IMGa appropriately tilted with respect to the display surface DS and the optical axis AX by itself in the anterior part of the aspheric mirror AM. Thus, it is possible to perform the ultra-short projection on the screen SC in a preferable imaging state.

Fourth Embodiment

Figure 18:
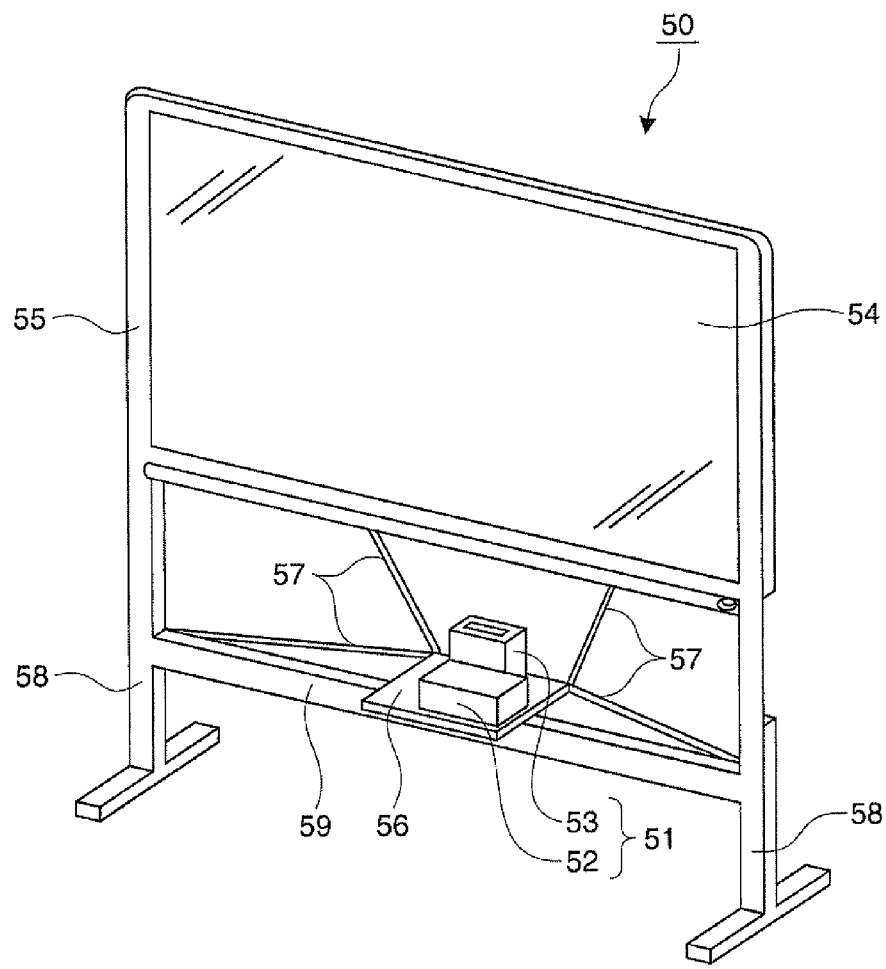
FIG. 18 is a front perspective view of an interactive board according to a fourth embodiment of the invention.

FIG. 18 is a front perspective view of an interactive board 50 according to a fourth embodiment of the invention. The interactive board 50 is provided with a projector 51 having substantially the same configuration as the projector 1 (see FIG. 1 and so on) according to any of the first through third embodiments, and a screen display section 54 disposed above the projector 51. Here, the projector 51 has a main body section 52 and a projection unit 53.

The main body 52 emits the picture light corresponding to the image signal. The projection unit 53 projects the picture light from the main body section 52 toward the screen display section 54. The main body section 52 and the projection unit 53 have substantially the same configurations as those of the main body section 2 (see FIG. 2 and so on) and the projection unit 3 (see FIG. 4 and so on) explained in the first through third embodiments, respectively. The optical elements of the projection unit 53 are housed in a housing. The housing is provided with an opening for emitting the picture light.

The screen display section 54 displays an image by the picture light input from the projector 51, and makes it possible to write a picture on the display surface. The screen display section 54 is made of a material of transmitting light such as semi-transmissive glass or synthetic resin. The user writes characters or pictures to the screen display section 54 using a writing tool such as a pen or a pointing stick. Further, the user erases the writing to the screen display section 54 using a erasing tool or the like.

The interactive board 50 is provided with a reading device (not shown) besides the above. The reading device reads the writing content written on the display surface of the screen display section 54, the picture displayed on the screen display section 54, and information and so on input by making a tool have contact with or come closer to the screen display section 54. As the reading device, for example, an image sensor such as a CCD camera is used. By providing the interactive board 50 with such a reading device, it becomes possible to record the writing content to the screen display section 54, the picture displayed thereon at that moment, the input information, and so on.

The screen display section 54 is installed while being attached to a base 55 shaped like a frame. A projector fixation section 56 as a plate like member to which the projector 51 is fixed is disposed on a prismatic column 59 connecting two leg sections 58 out of the base 55. The projector 51 is attached vertically below the screen display section 54 using the projector fixation section 56. Four rod-like members 57 radially extending so as to connect the projector fixation section 56 and the base 55 function as reinforcing members for reinforcing the attachment strength of the projector fixation section 56 in the base 55. Each of the rod-like members 57 is disposed between the projector 51 and the screen display section 54 on the periphery of the area, in which the picture light indicated by the dashed arrows in the drawing proceeds, so as not to interfere the picture light.

Figure 19:
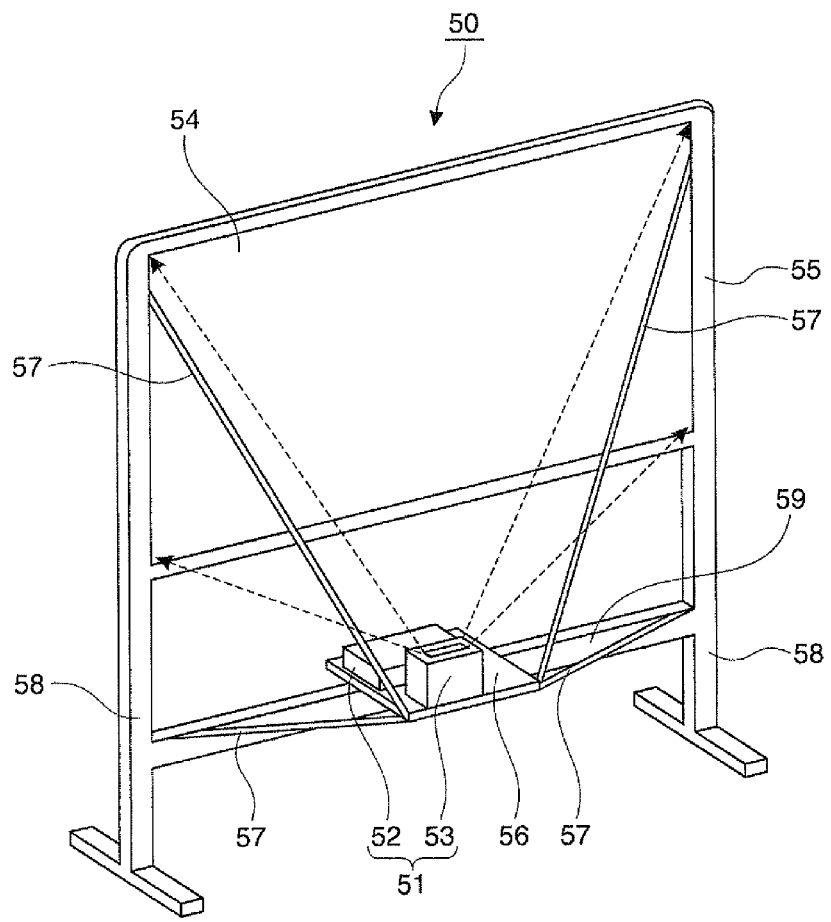
FIG. 19 is a rear perspective view of the interactive board.

FIG. 19 is a rear perspective view of the interactive board 50. The projector 51 performs the ultra-short projection of the picture light to the rear surface of the screen display section 54 on the opposite side to the front side on which the picture is observed. The screen display section 54 transmits the picture light, which is input to the rear surface (i.e., the irradiated surface) from the projector 51, to the front side. The screen display section 54 is provided with a light diffusion property of diffusing the picture light input from the projector 51. The screen display section 54 displays the picture displayed by inputting the picture light from the rear surface while superimposing the characters, pictures, and so on written on the obverse surface. The observer observes the characters, pictures, and so on written on the obverse surface and the picture light diffused by the screen display section 54.

Figure 20A:
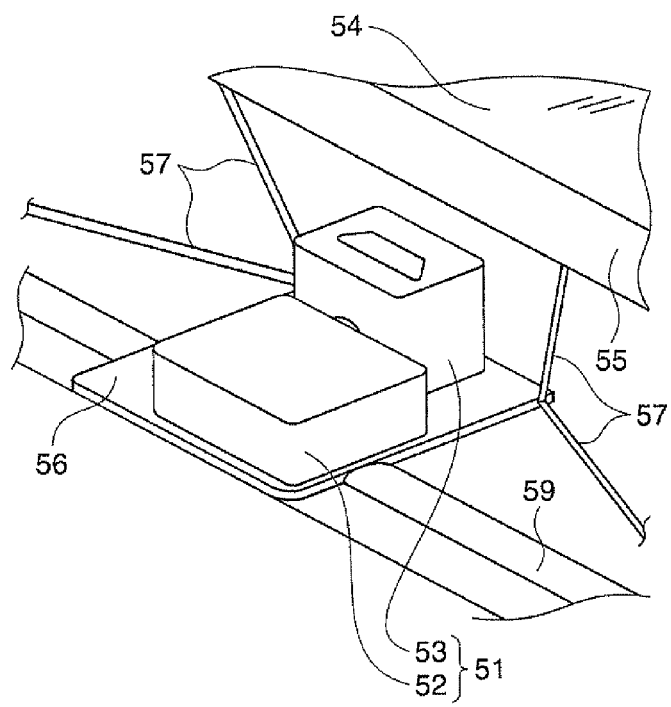
FIG. 20A is a diagram showing a projector fixation section and the peripheral section thereof.

FIG. 20A is a diagram showing the projector fixation section 56 and the peripheral section thereof in the state in which the projector 51 is installed out of the interactive board 50. In the interactive board 50, by fixing the projector 51 to the base 55 using the projector fixation section 56, it becomes possible to hold the projector 51 in the condition of being aligned with the screen display section 54 with high accuracy. Thus, it becomes possible to display a high-resolution picture in the screen display section 54. It should be noted that the projection unit 53 of the projector 51 is fixed to the projector fixation section 56, and the main body section 52 of the projector 51 is arranged to be able to be separated from the projection unit 53, and can be separated as a unit from the projector fixation section 56.

Figure 20B:
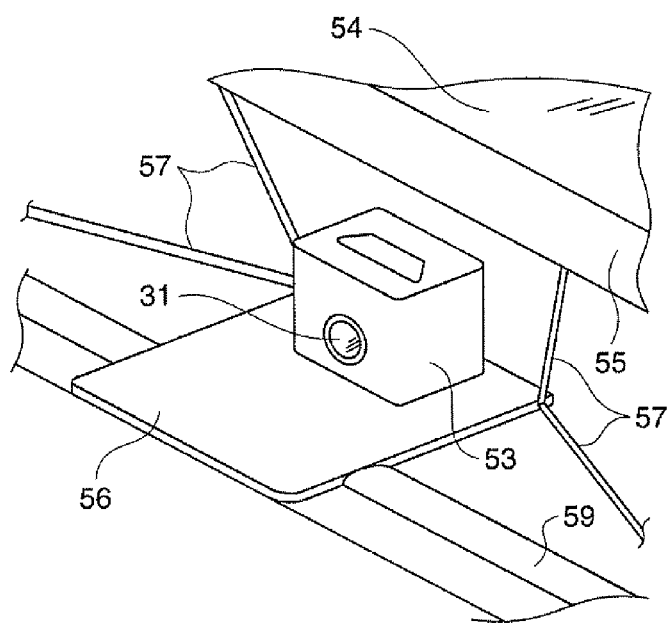
FIG. 20B is a diagram showing a state in which the main body section is detached in the state shown in FIG. 20A.

FIG. 20B is a diagram showing the state in which the main body section 52 is detached therefrom in the state shown in FIG. 20A. The main body section 52 is arranged to be detachably attached to the projector fixation section 56 if necessary, and is arranged to be able to be used alone. Thus, the use (the ultra-short projection) of the main body section 52 as the interactive board 50 by attaching the main body section 52 to the projector fixation section 56, and the middle and long-distance projection by detaching the main body section 52 from the interactive board 50 become possible.

By adopting the configuration of disposing the projector 51 vertically below the screen display section 54, the main body section 52 is installed at a lower position in the interactive board 50. Thus, the attachment of the main body section 52 to the interactive board 50 can be made easy.

Figure 21:
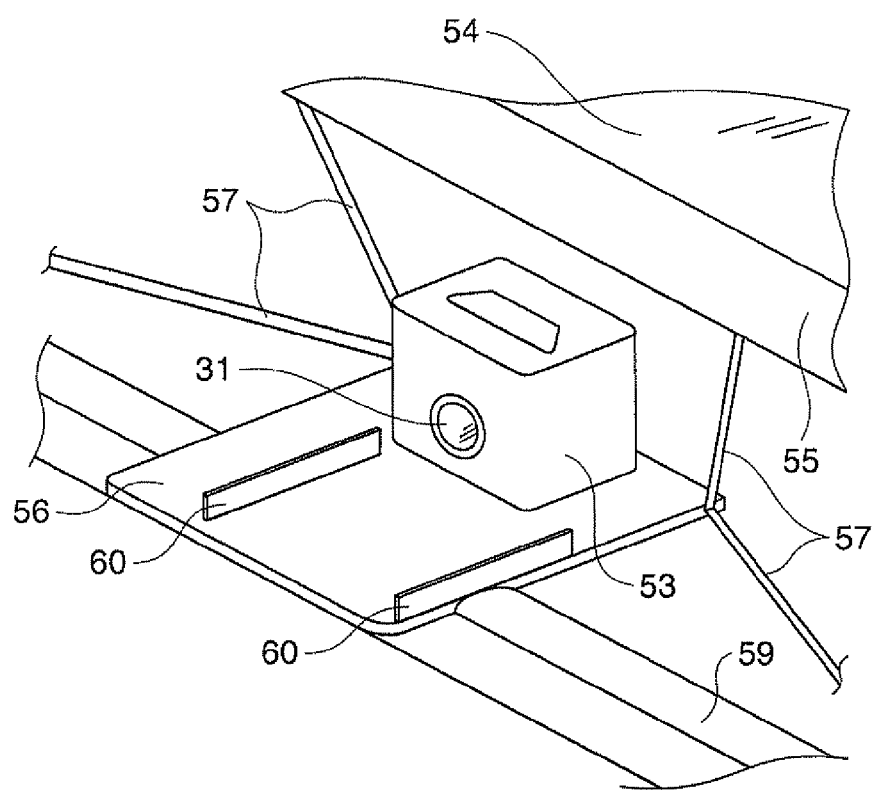
FIG. 21 is a diagram showing the projector fixation section provided with a guide structure.

It should be noted that it is also possible to arrange that the projector fixation section 56 is provided with a guide structure 60 for aligning the main body section 52 as shown in FIG. 21. As the guide structure 60, a plate-like member formed so as to follow the side surface of the main body section 52, for example, is used. By sliding the main body section 52 on the projector fixation section 56 along the guide structure 60, and then making the main body section 52 have contact with a case of the projection unit 53, the main body section 52 is positioned. Thus, the main body section 52 can easily be installed at a correct position every time the main body section 52 is attached to the interactive board 50. It should be noted that the guide structure 60 is not limited to the configuration illustrated here, but any configuration can be adopted providing the main body section 52 can be aligned with the projection unit 53 and so on in the interactive board 50.

Figure 22:
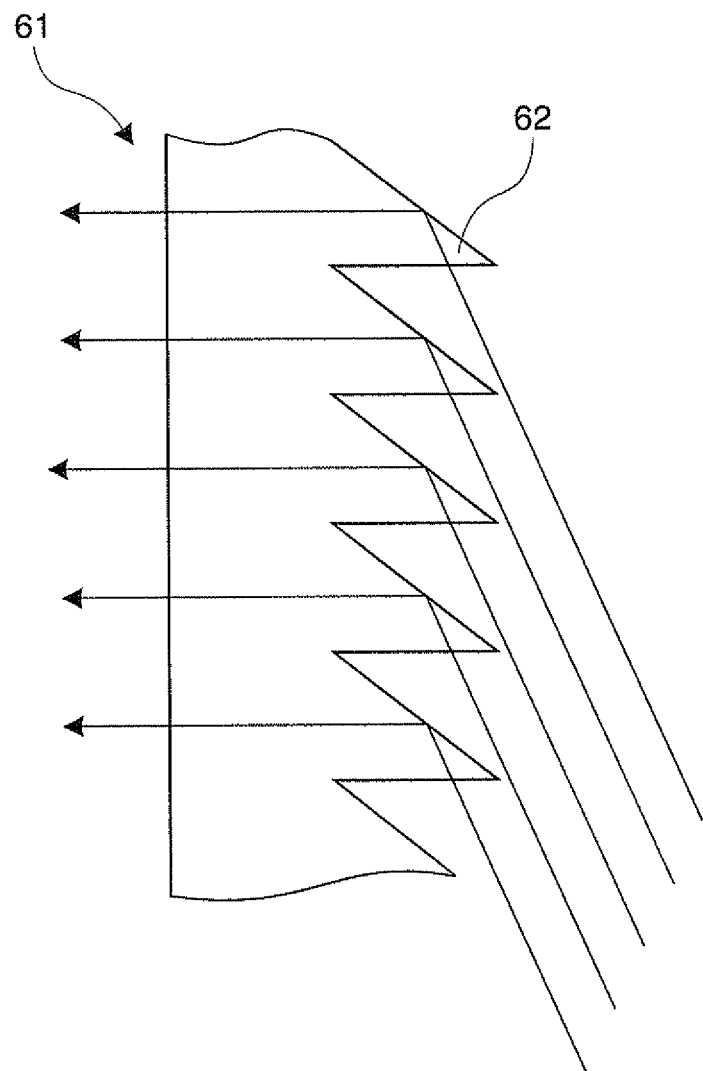
FIG. 22 is a schematic cross-sectional view of a Fresnel lens provided to a screen display section.

FIG. 22 is a schematic cross-sectional view of a Fresnel lens 61 provided to the screen display section 54. The Fresnel lens 61 is formed on the rear surface on the side, to which the picture light from the projector 51 is input, out of the screen display section 54. The Fresnel lens 61 functions as an angular conversion section for performing the angular conversion on the picture light. The Fresnel lens 61 is provided with a plurality of prism structures 62 each forming a roughly triangular cross-sectional shape. The prism structures 62 are arranged in a roughly concentric pattern centered on, for example, the optical axis AX (see FIG. 4 and so on). The Fresnel lens 61 performs the angular conversion on the picture light obliquely proceeding to the screen display section 54 to thereby make the picture light efficiently proceed toward the observer. Thus, it becomes possible for the interactive board 50 to display the picture, which is bright and has even brightness, in the screen display section 54.

The interactive board 50 adopts the projector 51 for the ultra-short projection with a super short-distance to thereby reduce the size in the depth direction. Further, by making it possible for the main body section 52 to perform the middle and long-distance projection by itself, a high level of versatility and convenience can be assured. By applying the projector 51 for enlarged projection capable of assuring a sufficient size in a short distance, it becomes possible for the interactive board 50 to reduce the weight, the power consumption, and the cost. Thus, there can be obtained an advantage of making it possible to reduce the weight, the power consumption, and the cost, and to suppress the depth size, and thus obtaining a high level of convenience.

Figure 23:
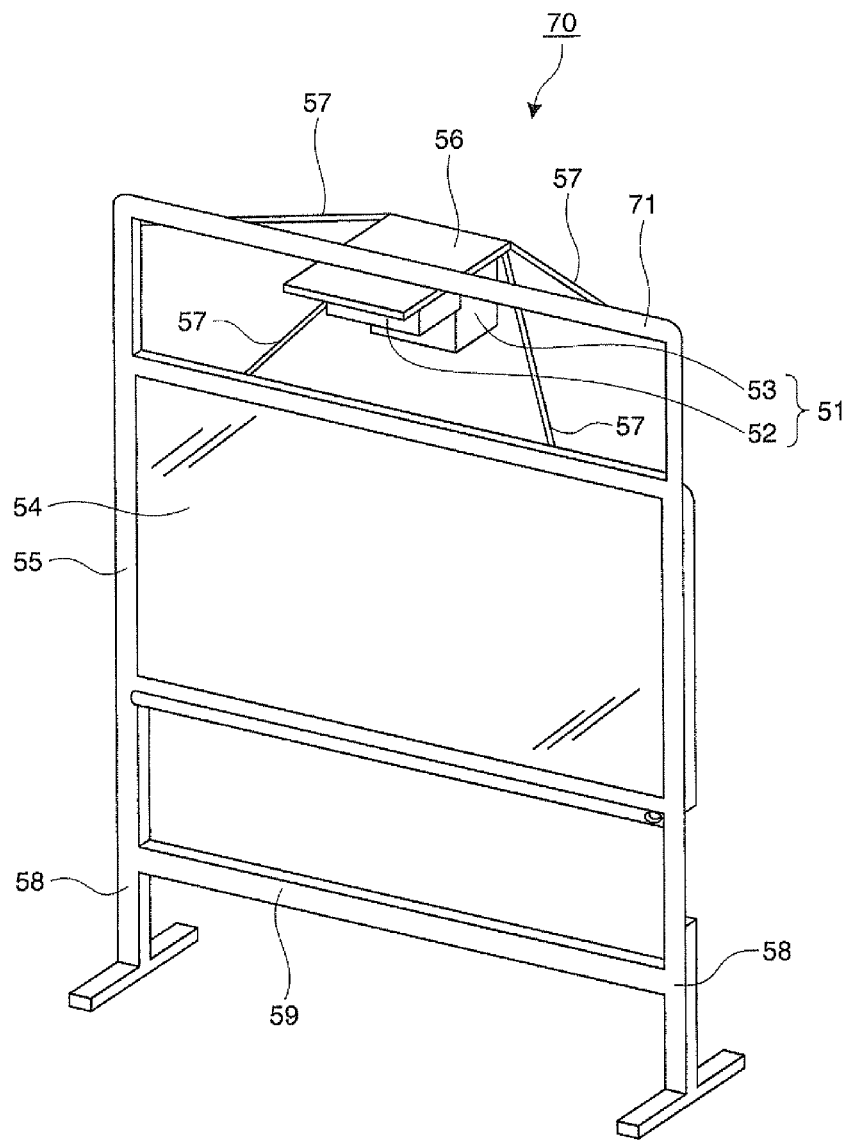
FIG. 23 is a front perspective view of an interactive board according to a modified example of the fourth embodiment.

FIG. 23 is a front perspective view of an interactive board 70 according to a modified example of the present embodiment. The interactive board 70 has a feature of attaching the projector 51 to the screen display section 54 on the vertically upside thereof. The projector fixation section 56 fixes the projector 51 to the prismatic column 71 disposed above the screen display section 54 out of the base 55.

By disposing the projector 51 vertically upside of the screen display section 54, the picture light is input to the screen display section 54 from the vertically upside. It results that the shadow of the writing tool occurs in the vertically downward direction when the user performs the writing to the screen display section 54. Thus, it is possible to reduce the case of losing the sight of the writing position due to the shadow to thereby enhance the convenience.

Although the projector 1, 51 according to the embodiments described above illuminate the entire desired area of each of the liquid crystal panels 18R, 18G, and 18B with roughly even brightness using the optical system provided with the first lens array, the second lens array, and the overlapping lens, the invention is not limited thereto, but it is also possible to illuminate the entire desired area of each of the liquid crystal panels 18R, 18G, and 18B using other illumination optical system such as an optical system provided with a light guide rod.

Although the projectors 1, 51 in the first through fourth embodiments described above are each applied as a front projector for projecting the projection image from the side of the observation in the case of, for example, the middle and long-distance projection, the invention can also be applied to a rear projector for projecting the projection image from the opposite side to the side of the observation.

Although the explanation is presented exemplifying the projectors 1, 51 according to the embodiments described above with the projector using the three liquid crystal panels, the invention is not limited thereto, but can be applied to the projector using one, two, four, or more liquid crystal panels.

The entire disclosure of Japanese Patent Application No. 2011-081648, filed Apr. 1, 2011 and Japanese Patent Application No. 2011-117677, filed May 26, 2011 are expressly incorporated by reference herein.

What is claimed is:
1. A projector comprising:
a main body section including
a light source,
a display surface irradiated with light from the light source, and
an emission optical system adapted to emit the light from the display surface, and once converting the light from the display surface into light forming an image plane of the display surface tilted with respect to the display surface; and
a projection unit adapted to project the light from the emission optical system, which is emitted from the display surface, toward an irradiated surface, and having an angle-widening mirror with a concave surface having positive power and adapted to reflect and widen an angle of light forming an image plane of the display surface tilted with respect to the display surface, wherein either one of the main body section and the projection unit includes a variable power optical system adapted to vary magnification of the image forming the image plane of the display surface tilted with respect to the display surface, and wherein the emission optical system is switchable between:
- a normal display state in which an image forming the image plane of the display surface parallel to the display surface is imaged within a first range with a relatively long distance along an optical axis, and
- a macro display state in which an image forming the image plane of the display surface tilted with respect to the display surface is imaged within a second range with a relatively short distance along the optical axis.

2. The projector according to claim 1, wherein:
the variable power optical system is a contraction optical system adapted to relatively contract the image forming the image plane of the display surface tilted with respect to the display surface.

3. The projector according to claim 1, wherein:
the projection unit images the image plane of the display surface tilted with respect to the display surface on the irradiated surface parallel to the display surface.

4. A projector comprising:
a main body section including
   a light source,
   a display surface illuminated by light from the light source, and
   an emission optical system adapted to emit light from the display surface; and
a projection unit adapted to project the light from the emission optical system, which is emitted from the display surface, toward an irradiated surface, and having an angle-widening mirror with a concave surface having positive power and adapted to reflect and widen an angle of light from the display surface,
wherein light forming an image plane of the display surface parallel to the display surface is provided in a first range with a relatively long distance along an optical axis, and light forming an image plane of the display surface tilted with respect to the display surface is provided in a second range with a relatively short distance along the optical axis.

5. The projector according to claim 1, wherein:
the main body section is detachably attached to the projector.

6. The projector according to claim 1, wherein:
the emission optical system and the projection unit are arranged so as to have respective optical axes aligned with each other.

7. The projector according to claim 6, wherein:
the emission optical system and the projection unit constitute a shift optical system adapted to cause the light from the display surface to be projected while being shifted from the optical axis.

8. An interactive board comprising:
the projector according to claim 1; and
a screen display section including the irradiated surface, and adapted to allow writing of other information on the irradiated surface,
wherein the main body section including the emission optical system out of the projector is detachably attached.

9. The projector according to claim 4, wherein
the main body section is detachably attached to the projector.

10. The projector according to claim 4, wherein
the emission optical system and the projection unit are arranged so as to have respective optical axes aligned with each other.

11. The projector according to claim 10, wherein:
the emission optical system and the projection unit constitute a shift optical system adapted to cause the light from the display surface to be projected while being shifted from the optical axis.

12. An interactive board comprising:
the projector according to claim 4; and
a screen display section including the irradiated surface, and adapted to allow writing of other information on the irradiated surface,
wherein the main body section including the emission optical system out of the projector is detachably attached.

* * * * *